(12) United States Patent
Kanbe et al.

(10) Patent No.: US 10,359,266 B2
(45) Date of Patent: Jul. 23, 2019

(54) POSITION MEASUREMENT METHOD OF OBJECT IN MACHINE TOOL AND POSITION MEASUREMENT SYSTEM OF THE SAME

(71) Applicant: Okuma Corporation, Niwa-Gun (JP)

(72) Inventors: Reiji Kanbe, Niwa-Gun (JP); Tetsuya Matsushita, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 217 days.

(21) Appl. No.: 15/481,548

(22) Filed: Apr. 7, 2017

(65) Prior Publication Data

US 2017/0299366 A1 Oct. 19, 2017

(30) Foreign Application Priority Data

Apr. 19, 2016 (JP) ................................. 2016-083859
Dec. 26, 2016 (JP) ................................. 2016-251488

(51) Int. Cl.
*G01B 5/016* (2006.01)
*G01B 5/008* (2006.01)
*B23Q 17/22* (2006.01)

(52) U.S. Cl.
CPC ............. *G01B 5/016* (2013.01); *B23Q 17/22* (2013.01); *G01B 5/008* (2013.01)

(58) Field of Classification Search
CPC ................................ G01B 5/016; G01B 5/008
USPC ..................................... 33/503, 502; 73/1.79
See application file for complete search history.

(56) References Cited

U.S. PATENT DOCUMENTS

| | | | | |
|---|---|---|---|---|
| 4,945,501 A | * | 7/1990 | Bell ........................ | G01B 7/008 318/632 |
| 6,178,389 B1 | * | 1/2001 | Sola ........................ | G01B 5/008 33/503 |
| 7,055,367 B2 | * | 6/2006 | Hajdukiewicz ...... | G01B 21/042 33/501.02 |
| 8,800,159 B2 | * | 8/2014 | Matsushita .......... | G05B 19/404 33/503 |
| 2012/0253505 A1 | * | 10/2012 | Matsushita .......... | G05B 19/401 700/193 |
| 2013/0192054 A1 | | 8/2013 | Sato | |
| 2016/0116275 A1 | * | 4/2016 | Matsushita .......... | G01B 21/042 702/95 |
| 2017/0308055 A1 | * | 10/2017 | Hoshino .............. | G05B 19/409 |

FOREIGN PATENT DOCUMENTS

JP 2001-105279 A1 4/2001
JP 2012-061570 A1 3/2012

\* cited by examiner

*Primary Examiner* — Christopher W Fulton
(74) *Attorney, Agent, or Firm* — Burr & Brown, PLLC

(57) ABSTRACT

A position measurement method to measure a position of an object in a machine tool includes a tool sensor position acquisition stage, a reference block position acquisition stage, a relative position calculation stage, a reference tool position acquisition stage, a position measurement sensor measurement stage, a length compensation value calculation stage, and a position measurement stage. In the position measurement stage, the measurement position of the object is compensated using a length direction compensation value of a position measurement sensor calculated in the length compensation value calculation stage. The object is measured by the position measurement sensor installed to a main spindle.

14 Claims, 24 Drawing Sheets

POSITION MEASUREMENT METHOD OF OBJECT IN MACHINE TOOL AND POSITION MEASUREMENT SYSTEM OF THE SAME

BACKGROUND

This application claims the benefit of Japanese Patent Application Numbers 2016-083859 filed on Apr. 19, 2016 and 2016-251488 filed on Dec. 26, 2016, the entirety of which is incorporated by reference.

TECHNICAL FIELD

The disclosure relates to a position measurement method and a position measurement system to measure a position of an object such as a tool and a workpiece in a machine tool.

RELATED ART

There has been employed a method where a machine tool, which performs processes on a workpiece mounted on a table with a tool installed to a main spindle and rotated, automatically measures and compensates a length of the tool and a position of the workpiece for highly accurate processes.

The automatic measurement method for the tool length uses, for example, a laser sensor 10 as illustrated in FIG. 2 and a touch sensor 20 as illustrated in FIG. 3.

Firstly, the laser sensor 10 includes a light emitting portion 11, a light receiving portion 12, and a base portion 13 to support the light emitting portion 11 and the light receiving portion 12. The light emitting portion 11 outputs laser light 14, and the light receiving portion 12 receives the laser light 14. When the laser light 14 is obstructed by a substance and therefore a light-receiving rate becomes a certain rate or less, the laser sensor 10 generates a signal. Here, a tool 9 is installed to a main spindle 2 and the tool 9 is caused to approach the laser light 14 in a Z-axis while the tool 9 is rotated at a predetermined speed. When the tool 9 cuts off the laser light 14, the base portion 13 transmits the signal. A control device for the machine tool that detects the signal stores a position of the Z-axis at a time point of the reception of the signal or a time point considering the delay. The similar operations are also performed on a reference tool for length reference of respective tools. A difference between the Z-axis position of the tool 9 and a Z-axis position of the reference tool is determined as the length of the tool 9.

Next, the touch sensor 20 is a device that generates a signal when the touch sensor 20 senses a contact. When the tool 9 is installed to the main spindle 2, is caused to approach the touch sensor 20 in the Z-axis, and contacts the touch sensor 20, the touch sensor 20 transmits the signal. The control device that senses the signal stores the Z-axis position at a time point of the reception of the signal or a time point considering the delay. The similar operations are also performed on the reference tool for length reference of the respective tools. A difference between the Z-axis position of the tool 9 and a Z-axis position of the reference tool is determined as the length of the tool 9.

Meanwhile, the automatic measurement method for the position of the workpiece uses, for example, a touch trigger probe 30 as illustrated in FIG. 4. The touch trigger probe 30 is a device that outputs a signal when a contact maker contacts the substance. When the touch trigger probe 30 is installed to the main spindle 2, is caused to approach a workpiece 31 on the table 3 in a Z-axis, and contacts the workpiece 31, the touch trigger probe 30 outputs the signal. The control device that senses the signal acquires the Z-axis position at a time point of the reception of the signal or a time point considering the delay.

A length of the touch trigger probe 30 with respect to the reference tool is preliminary measured to use the length as a compensation value in a length direction of the touch trigger probe 30 for compensation and measurement, and thus, the position (a height in this case) of the workpiece 31 is acquired. It should be noted that, since the touch trigger probe 30 causes a certain constant change in length until outputting a trigger signal after the contact with the object, an actual length when the touch trigger probe 30 contacts the object and outputs the trigger signal is required.

However, the touch trigger probe 30 does not contact the object with the laser sensor 10, and therefore, the length of the touch trigger probe 30 in contact cannot be measured.

Meanwhile, with regard to the touch sensor 20, the touch sensor 20 and the touch trigger probe 30 have respective different operating resistances. Accordingly, both cannot simultaneously output the trigger signals, failing to measure the length of the touch trigger probe 30 in contact.

A method using a reference tool (hereinafter referred to as a "method 1") has been known as the measuring method for the length of the touch trigger probe in contact. With the method 1, the reference tool is installed to a main spindle, a position at which a clearance between a block gauge and the reference tool becomes almost 0 is found from a resistance when the block gauge is manually moved while a Z-axis is manually operated such that the reference tool contacts a reference surface such as a table top surface via the block gauge, and the position is recorded. Next, with the touch trigger probe, the reference surface is measured, that is, a Z-axis position when the touch trigger probe is in contact is acquired. A value found by subtracting the recorded Z-axis position of the reference tool and a thickness of the block gauge from the Z-axis position acquired by the touch trigger probe is the length of the touch trigger probe in contact.

Japanese Unexamined Patent Application Publication No. 2012-61570 discloses a measuring method for a length of a touch trigger probe in contact using a CCD camera. With the method, first, the touch trigger probe is brought in contact with a top surface of a holding block, a position of a main spindle when a signal is output is acquired, and a distal end of the touch trigger probe in contact is photographed by the CCD camera to measure a distal end position. Next, with the method, the holding block is removed to recover the length when the touch trigger probe is not in contact and the distal end position is measured by the CCD camera. An amount of shrinkage in contact is calculated from a difference between both distal end positions. A distal end position of the reference tool is measured by the CCD camera to acquire a position of the main spindle at the time as well. The length of the touch trigger probe in contact is acquired from a relationship between the acquired amount of shrinkage in contact, distal end position of the touch trigger probe in contact, main spindle position while the touch trigger probe is in contact, distal end position of the reference tool, and main spindle position with the reference tool.

On the other hand, Japanese Unexamined Patent Application Publication No. 2001-105279 discloses a compensation method of a workpiece position using a laser sensor and a reference block. First, the reference block is prepared near the laser sensor and a position of the laser light is matched with a position (height) of a top surface of the reference block. With the laser sensor, a position where the reference tool is installed is stored. Next, the touch trigger probe is brought into contact with the reference block and the position is stored, and the touch trigger probe is also brought into contact with the workpiece and the position is stored. The workpiece position with respect to the reference tool is measured and compensated from a difference between both positions and the position of the reference tool. With this method, the workpiece position is measured without acquiring the length of the touch trigger probe in contact.

However, when the above method 1 is applied, the following disadvantages exist. First, since hand work is required in the method 1, the length of the touch trigger probe in contact cannot be automatically measured. Accordingly, in the case where the length of the touch trigger probe changes due to a thermal displacement or a similar cause, there is a problem of the necessity of suspending a process for hand work to measure the length of the touch trigger probe in contact.

Further, the technique of JP-A-2012-61570 has a problem of requiring the measuring device with a CCD camera which is expensive. To automatically remove the holding block, a mechanism to drive the holding block and an actuator are required, causing a problem of cost increase.

On the other hand, the technique of JP-A-2001-105279 allows measuring the position of the workpiece without the measurement of the length of the touch trigger probe in contact. However, the technique requires matching the laser light position of the laser sensor with the reference block position or knowing a positional relationship between both in advance. The required information in the method 1 of JP-A-2001-105279 means that a relationship between the length of the reference tool measured by the laser sensor and the length of the touch trigger probe with which the reference block is brought into contact, that is, the length of the touch trigger probe in contact needs to be known in advance. However, JP-A-2001-105279 does not disclose the method.

With respect to the above disadvantages, an object of the disclosure is to provide a position measurement method and a position measurement for an object in a machine tool that can acquire a length direction compensation value of a position measurement sensor such as a touch trigger probe and can measure the object by the position measurement sensor at high accuracy with a comparatively low-price configuration.

SUMMARY

In order to achieve the above-described object, there is provided a position measurement method of object in machine tool according to a first aspect of the disclosure. The position measurement method may be for measuring a position of the object secured on a table by a position measurement sensor using the machine tool. The machine tool may include three or more translational axes, a rotatable main spindle to which a tool is to be installed, and the table. The position measurement sensor may be installable to the main spindle. The position measurement method may execute a tool sensor position acquisition stage, a reference block position acquisition stage, a relative position calculation stage, a reference tool position acquisition stage, a position measurement sensor measurement stage, a length compensation value calculation stage, and a position measurement stage. In the tool sensor position acquisition stage, a reference tool for a length reference of the tool may be installed to the main spindle and a sensing position of a distal end of the reference tool may be acquired using a tool sensor. In the reference block position acquisition stage, positions of the translational axes when the reference tool installed to the main spindle is directly or indirectly brought into contact with a reference block disposed at the tool sensor side may be acquired. In the relative position calculation stage, a relative position of the reference block with respect to the sensing position may be calculated from the sensing position acquired in the tool sensor position acquisition stage and the positions of the translational axes acquired in the reference block position acquisition stage. In the reference tool position acquisition stage, the reference tool may be installed to the main spindle and a reference tool position may be acquired using the tool sensor. The reference tool position may be a distal end position of the reference tool. In the position measurement sensor measurement stage, the position measurement sensor may be installed to the main spindle and a position of the reference block may be measured using the position measurement sensor. In the length compensation value calculation stage, a length direction compensation value of the position measurement sensor may be calculated from the reference tool position acquired in the reference tool position acquisition stage, the position of the reference block measured in the position measurement sensor measurement stage, the relative position calculated in the relative position calculation stage, and the length of the reference tool. In the position measurement stage, the measurement position of the object may be compensated using the length direction compensation value of the position measurement sensor calculated in the length compensation value calculation stage. The object may be measured by the position measurement sensor installed to the main spindle.

"The tool sensor side" may obviously include the case of directly disposing the reference block to the tool sensor and also may include the case of disposing the reference block separately near the tool sensor. The same may apply to the following disclosures.

With the position measurement method of object in machine tool according to a second aspect of the disclosure, which is in the first aspect of the disclosure, the tool sensor position acquisition stage to the relative position calculation stage may be configured to be executed once, and the reference tool position acquisition stage to the position measurement stage may be configured to be executed several times.

With the position measurement method of object in machine tool according to a third aspect of the disclosure, which is in the first aspect of the disclosure, in the position measurement sensor measurement stage and the position measurement stage, the positions measured by the position measurement sensor may be positions of the translational axes when the position measurement sensor senses a contact with the object.

With the position measurement method of object in machine tool according to a fourth aspect of the disclosure, which is in the first aspect of the disclosure, a diameter compensation value acquisition stage may be further executed. In the diameter compensation value acquisition stage, a radial direction compensation value of the position measurement sensor as a contact type sensor to the object may be acquired. The diameter compensation value acquisition stage may be performed before the execution of the position measurement stage. In the position measurement stage, the measurement position of the object may be compensated also using the diameter compensation value acquired in the diameter compensation value acquisition stage.

In order to achieve the above-described object, there is provided a position measurement system of object in machine tool according to a fifth aspect of the disclosure. The position measurement system may be for measuring a position of the object secured on a table by a position measurement sensor in the machine tool. The machine tool may include three or more translational axes, a rotatable main spindle to which a tool is to be installed, the table, the position measurement sensor installable to the main spindle, and a control device configured to control the translational axes and the main spindle. The position measurement system may include a reference tool, a tool sensor, a reference block, a tool sensor position acquisition means, a reference block position acquisition means, a relative position calculation means, a reference tool position acquisition means, a measurement position acquisition means, a length compensation value calculation means, and a position calculation means. The reference tool may be for a length reference of the tool. The tool sensor may be configured to detect a distal end position of the reference tool installed to the main spindle. The reference block may be installed to the tool sensor side. The tool sensor position acquisition means may be configured to move the reference tool installed to the main spindle in the translational axes. The tool sensor position acquisition means may be configured to acquire and store a sensing position of the distal end of the reference tool with the tool sensor. The reference block position acquisition means may be configured to move the reference tool installed to the main spindle in the translational axes to directly or indirectly bring the reference tool into contact with the reference block. The reference block position acquisition means may be configured to acquire and store positions of the translational axes at the contact. The relative position calculation means may be configured to calculate and store a relative position of the reference block with respect to the sensing position from the sensing position acquired in the tool sensor position acquisition means and the positions of the translational axes acquired in the reference block position acquisition means. The reference tool position acquisition means may be configured to move the reference tool installed to the main spindle in the translational axes. The reference tool position acquisition means may be configured to acquire and store a reference tool position using the tool sensor. The reference tool position may be the distal end position of the reference tool. The measurement position acquisition means may be configured to measure and store a position of the reference block with the position measurement sensor installed to the main spindle. The length compensation value calculation means may be configured to calculate and store a length direction compensation value of the position measurement sensor from the reference tool position acquired in the reference tool position acquisition means, the position of the reference block acquired in the measurement position acquisition means, the relative position acquired in the relative position calculation means, and the length of the reference tool. The position calculation means may be configured to compensate the measurement position of the position measurement sensor using the length compensation value stored in the length compensation value calculation means to calculate the position of the object.

With the position measurement system of object in machine tool according to a six aspect of the disclosure, which is in the fifth aspect of the disclosure, the position measurement sensor may be configured to measure the positions of the translational axes when the position measurement sensor senses the object with or without considering a signal delay.

The position measurement system of object in machine tool according to a seventh aspect of the disclosure, which is in the fifth aspect of the disclosure, may further include a diameter compensation value acquisition means. The diameter compensation value acquisition means may be configured to acquire and store a radial direction compensation value of the position measurement sensor as a contact type sensor to the object. The position calculation means may be configured to compensate the measurement position of the position measurement sensor using the length compensation value acquired in the length compensation value calculation means and the diameter compensation value acquired in the diameter compensation value acquisition means to calculate the position of the object.

In order to achieve the above-described object, there is provided a position measurement method of object in machine tool according to an eighth aspect of the disclosure. The position measurement method may be for measuring a position of the object secured on a table by a position measurement sensor using the machine tool. The machine tool may include three or more translational axes, a rotatable main spindle to which a tool is to be installed, and the table. The position measurement sensor may be installable to the main spindle. The position measurement method may use a tool sensor and a reference block disposed at the tool sensor side. The position measurement method may execute a tool sensor position acquisition stage, a reference tool measurement position acquisition stage, a position measurement sensor measurement position acquisition stage, a position measurement sensor length calculation stage, a first reference block position acquisition stage, a relative position calculation stage, a reference tool position acquisition stage, a second reference block position acquisition stage, a length compensation value calculation stage, and a position measurement stage. In the tool sensor position acquisition stage, a reference tool for a length reference of the tool may be installed to the main spindle and a sensing position of a distal end of the reference tool may be acquired using the tool sensor. In the reference tool measurement position acquisition stage, any given tool measurement position may be acquired using the reference tool installed to the main spindle. In the position measurement sensor measurement position acquisition stage, any given sensor measurement position may be acquired using the position measurement sensor installed to the main spindle. In the position measurement sensor length calculation stage, a difference between the tool measurement position and the sensor measurement position may be acquired to acquire a length of the position measurement sensor on a basis of the difference and the length of the reference tool. In the first reference block position acquisition stage, a position of the reference block may be measured using the position measurement sensor installed to the main spindle. In the relative position calculation stage, a relative position of the reference block with respect to the sensing position may be calculated from the sensing position acquired in the tool sensor position acquisition stage, the position of the reference block acquired in the first reference block position acquisition stage, the length of the position measurement sensor calculated in the position measurement sensor length calculation stage, and the length of the reference tool. In the reference tool position acquisition stage, the reference tool may be installed to the main spindle and a reference tool position may be acquired using the tool sensor. The reference tool position may be the distal end position of the reference tool. In the second reference block position acquisition stage, the position measurement sensor may be installed to the main spindle and a position of the reference block is measured using the position measurement sensor. In the length compensation value calculation stage, a length direction compensation value of the position measurement sensor may be calculated from the reference tool position acquired in the reference tool position acquisition stage, the position of the reference block measured in the second reference block position acquisition stage, the relative position calculated in the relative position calculation stage, and the length of the reference tool. In the position measurement stage, the measurement position of the object may be compensated using the length direction compensation value of the position measurement sensor calculated in the length compensation value calculation stage. The object may be measured by the position measurement sensor installed to the main spindle.

With the position measurement method of object in machine tool according to a ninth aspect of the disclosure, which is in the eighth aspect of the disclosure, the tool sensor position acquisition stage to the relative position calculation stage may be configured to be executed once. The reference tool position acquisition stage to the position measurement stage may be configured to be executed several times.

With the position measurement method of object in machine tool according to a tenth aspect of the disclosure, which is in the eighth aspect of the disclosure, in the first reference block position acquisition stage, the second reference block position acquisition stage, and the position measurement stage, the positions measured by the position measurement sensor may be positions of the translational axes when the position measurement sensor senses a contact with the object.

With the position measurement method of object in machine tool according to an eleventh aspect of the disclosure, which is in the eighth aspect of the disclosure, a diameter compensation value acquisition stage may be further executed. In the diameter compensation value acquisition stage, a radial direction compensation value of the position measurement sensor as a contact type sensor to the object may be acquired. The diameter compensation value acquisition stage may be performed before the execution of the position measurement stage. In the position measurement stage, the measurement position of the object may be compensated also using the diameter compensation value acquired in the diameter compensation value acquisition stage.

In order to achieve the above-described object, there is provided a position measurement system of object in machine tool according to a twelfth aspect of the disclosure. The position measurement system may be for measuring a position of the object secured on a table by a position measurement sensor in the machine tool. The machine tool may include three or more translational axes, a rotatable main spindle to which a tool is to be installed, the table, the position measurement sensor installable to the main spindle, and a control device configured to control the translational axes and the main spindle. The position measurement system may include a reference tool, a tool sensor, a reference block, a tool sensor position acquisition means, a reference tool measurement position acquisition means, a position measurement sensor measurement position acquisition means, a position measurement sensor length calculation means, a first reference block position acquisition means, a relative position calculation means, a reference tool position acquisition means, a second reference block position acquisition means, a length compensation value calculation means, and a position calculation means. The reference tool is for a length reference of the tool. The tool sensor may be configured to detect a distal end position of the reference tool installed to the main spindle. The reference block may be installed to the tool sensor side. The tool sensor position acquisition means may be configured to acquire and store a sensing position of the distal end of the reference tool with the reference tool installed to the main spindle and the tool sensor. The reference tool measurement position acquisition means may be configured to acquire and store any given tool measurement position using the reference tool installed to the main spindle. The position measurement sensor measurement position acquisition means may be configured to acquire and store any given sensor measurement position using the position measurement sensor installed to the main spindle. The position measurement sensor length calculation means may be configured to acquire a difference between the tool measurement position and the sensor measurement position. The position measurement sensor length calculation means may be configured to calculate and store a length of the position measurement sensor on the basis of the difference and the length of the reference tool. The first reference block position acquisition means may be configured to measure and store a position of the reference block with the position measurement sensor installed to the main spindle. The relative position calculation means may be configured to calculate and store a relative position of the reference block with respect to the sensing position from the sensing position acquired in the tool sensor position acquisition means, the position of the reference block acquired in the first reference block position acquisition means, the length of the position measurement sensor calculated in the position measurement sensor length calculation means, and the length of the reference tool. The reference tool position acquisition means may be configured to acquire and store a reference tool position using the reference tool installed to the main spindle and the tool sensor. The reference tool position may be the distal end position of the reference tool. The second reference block position acquisition means may be configured to measure and store a position of the reference block using the position measurement sensor installed to the main spindle. The length compensation value calculation means may be configured to calculate and store a length direction compensation value of the position measurement sensor from the reference tool position acquired in the reference tool position acquisition means, the position of the reference block measured in the second reference block position acquisition means, the relative position calculated in the relative position calculation means, and the length of the reference tool. The position calculation means may be configured to compensate the measurement position of the object measured by the position measurement sensor installed to the main spindle using the length direction compensation value of the position measurement sensor calculated in the length compensation value calculation means. The position calculation means may be configured to calculate a position of the object.

The position measurement system of object in machine tool according to a thirteenth aspect of the disclosure, which is in the twelfth aspect of the disclosure, the position measurement sensor may be configured to measure the positions of the translational axes when the position measurement sensor senses the object with or without considering a signal delay.

The position measurement system of object in machine tool according to a fourteenth aspect of the disclosure, which is in the twelfth aspect of the disclosure, may further include a diameter compensation value acquisition means. The diameter compensation value acquisition means may be configured to acquire and store a radial direction compensation value of the position measurement sensor as a contact type sensor to the object. The position calculation means may be configured to compensate the measurement position of the position measurement sensor using the length compensation value acquired in the length compensation value calculation means and the diameter compensation value acquired in the diameter compensation value acquisition means to calculate a position of the object.

With the disclosure, the relative position between the sensing position of the tool sensor and the reference block is known in advance from the relationship between the sensing position of the tool sensor and the reference tool position where the reference tool or the position measurement sensor is brought into contact with the reference block. Thereafter, the tool sensor measures the reference tool position and the position measurement sensor measures the position of the reference block to allow the acquisition of the length direction compensation value of the position measurement sensor. Therefore, the position measurement sensor can highly accurately measure the object through the compensation using the length direction compensation value even if the length of the position measurement sensor changes due to the thermal displacement or a similar cause. This method eliminates the need for the measurement system with the CCD camera or a similar system, thus ensuring and achieving a comparatively low price. Especially, with the disclosure according to the aspects 8 to 14, since the reference block position disposed at the tool sensor side is measured by the position measurement sensor, it is only necessary to configure an area of the reference block by the amount that the distal end probe of the position measurement sensor can contact the reference block position. Therefore, the reference block is made small, thereby ensuring and achieving a further compact position measurement system.

In the case where the position measurement sensor is the contact type sensor, when the compensation values of the position measurement sensor in the radial directions is acquired together, further highly accurate position measurement of the workpiece is possible.

DETAILED DESCRIPTION

The following describes embodiments of the disclosure based on the drawings.

Figure 1:
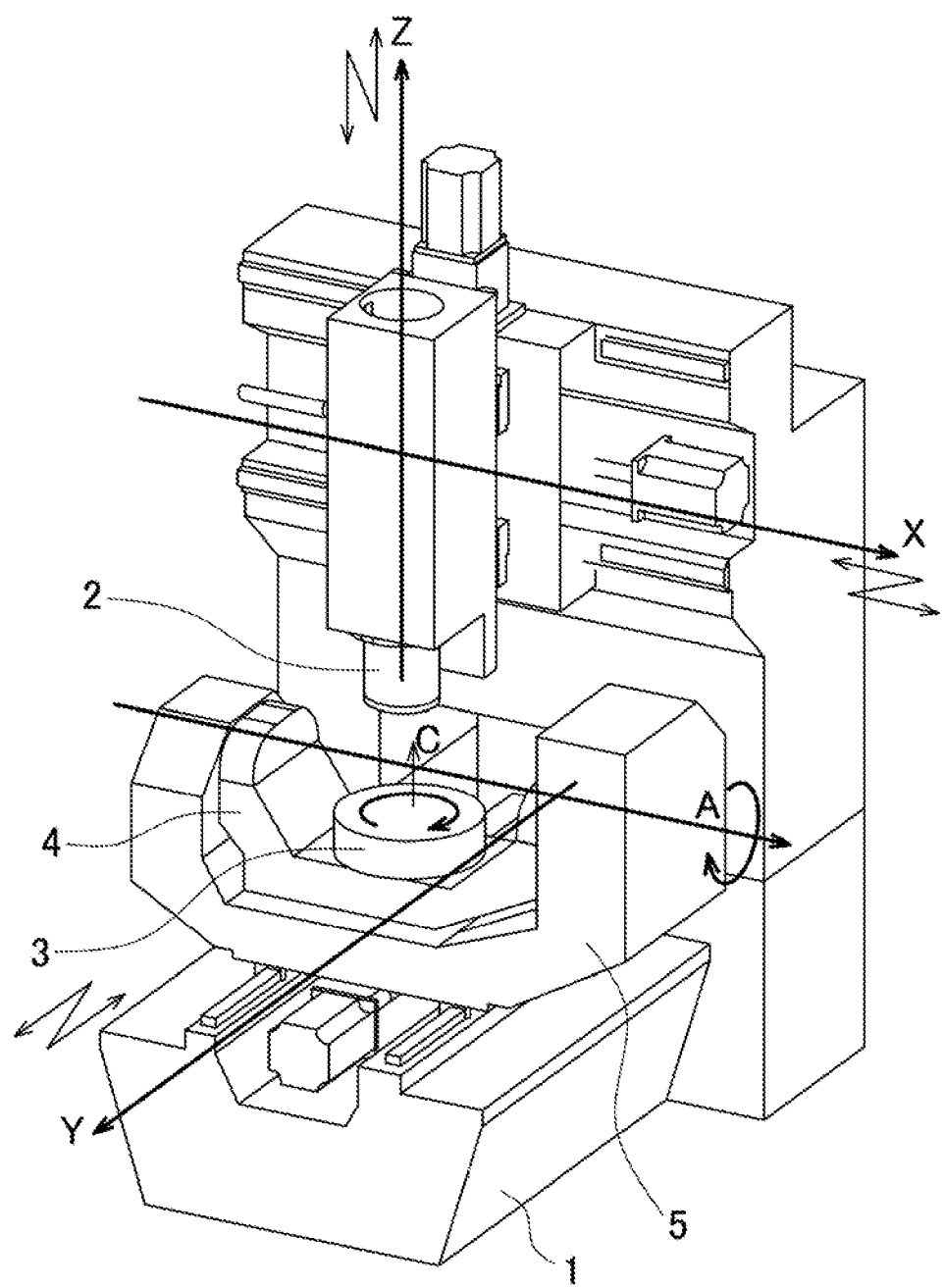
FIG. 1 is a schematic diagram of a machining center.

FIG. 1 is a schematic diagram of a machining center, which is one configuration of a machine tool that includes three translational axes orthogonal to one another and two rotation axes orthogonal to one another. A motion of two degrees of freedom for translation of a main spindle 2 in an X-axis and a Z-axis, which are the translational axes and are orthogonal to one another, is possible with respect to a bed 1. A motion of one degree of freedom for rotation of a table 3 in a C-axis, which is the rotation axis, is possible with respect to a cradle 4. A motion of one degree of freedom for rotation of the cradle 4 in an A-axis, which is the rotation axis orthogonal to the C-axis, is possible with respect to a trunnion 5. A motion of one degree of freedom for translation of the trunnion 5 in a Y-axis, which is the translational axis and orthogonal to the X-axis and the Z-axis, is possible with respect to the bed 1. Accordingly, the motions of the three degrees of freedom for translation and the two degrees of freedom for rotation of the main spindle 2 are possible with respect to the table 3. Servo motors, which are controlled by a numeral value control unit (not illustrated), drive respective feed axes. A workpiece is secured to the table 3, a tool is installed to the main spindle 2 and rotated, and a relative position and a relative posture between the workpiece and the tool are controlled, thus ensuring processes of the workpiece.

A machine related to the disclosure is not limited to the machining center but may be a machine tool such as a lathe, a multitasking machine, and a grinder. The number of axes is not limited to five axes, but the translational axes alone may be three axis, four axes, and six axes. Further, the mechanism is not limited to one that the table 3 has the two degrees of freedom for rotation or more in the rotation axes, but a mechanism where the main spindle 2 has the two degrees of freedom for rotation or more and a mechanism where the main spindle 2 and the table 3 each have the one degree of freedom for rotation or more may be employed.

Figure 2:
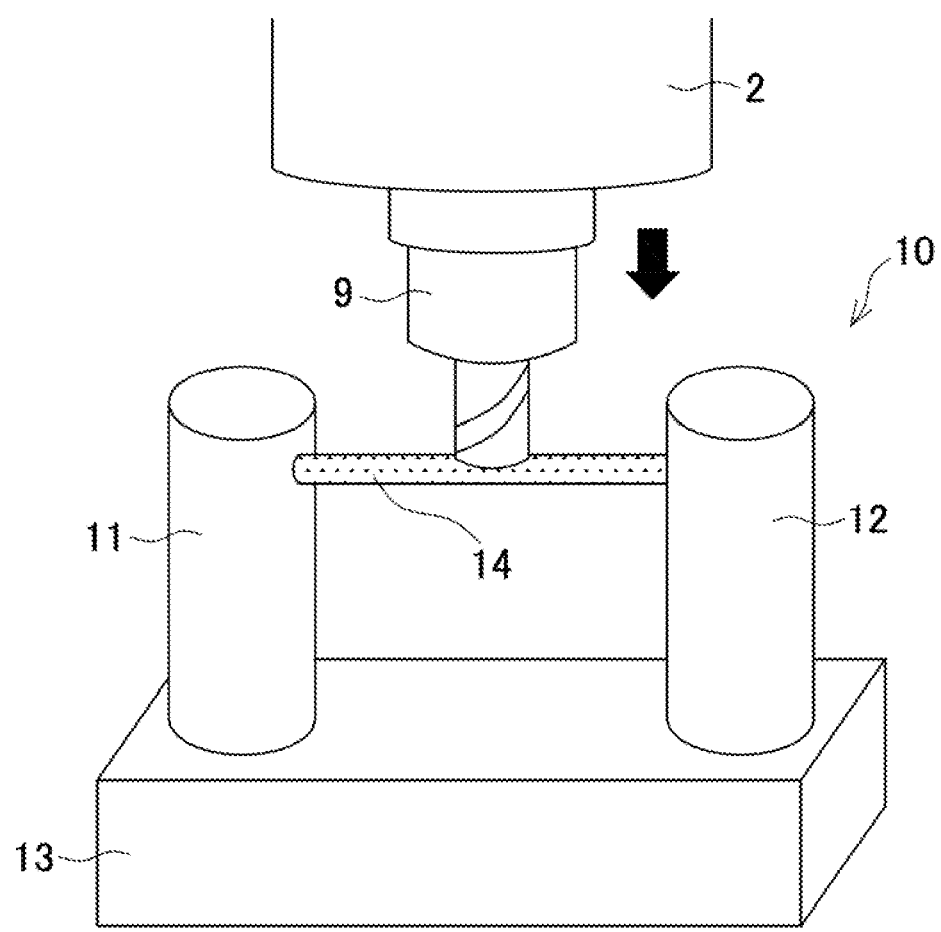
FIG. 2 is a schematic diagram of a laser sensor.
Figure 3:
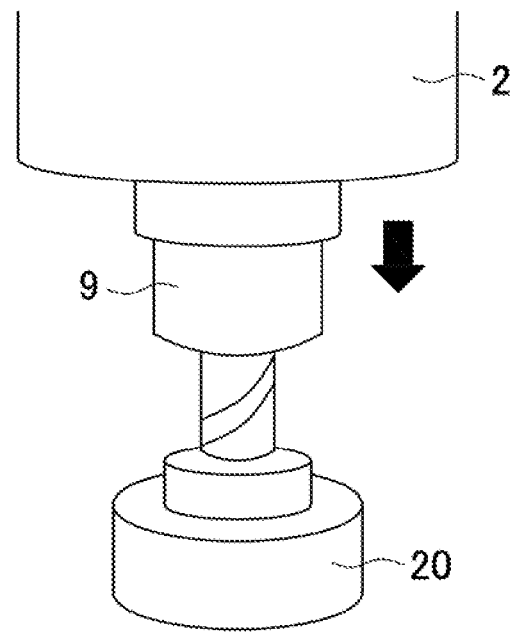
FIG. 3 is a schematic diagram of a touch sensor.
Figure 5:
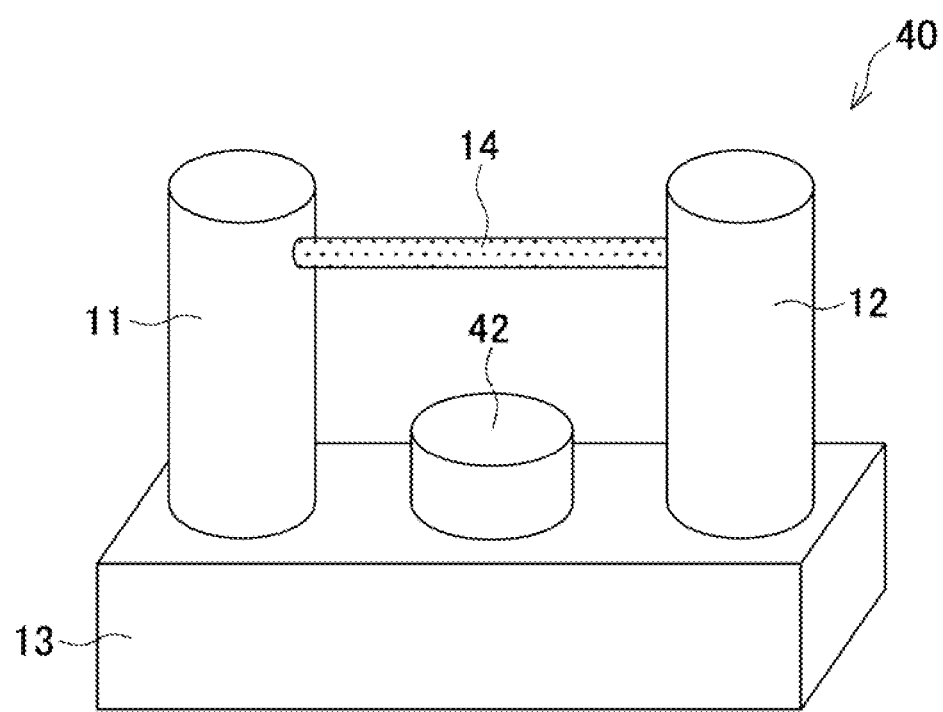
FIG. 5 is a schematic diagram of a laser sensor as one example of a tool sensor of the disclosure.

FIG. 5 is a schematic diagram of a laser sensor 40 as one example of a tool sensor of the disclosure. While the laser sensor 40 includes a light emitting portion 11, a light receiving portion 12, and a base portion 13 similar to FIG. 2, the laser sensor 40 here includes a reference block 42 between the light emitting portion 11 and the light receiving portion 12. The light emitting portion 11, the light receiving portion 12, and the reference block 42 are each secured to the base portion 13.

Figure 6:
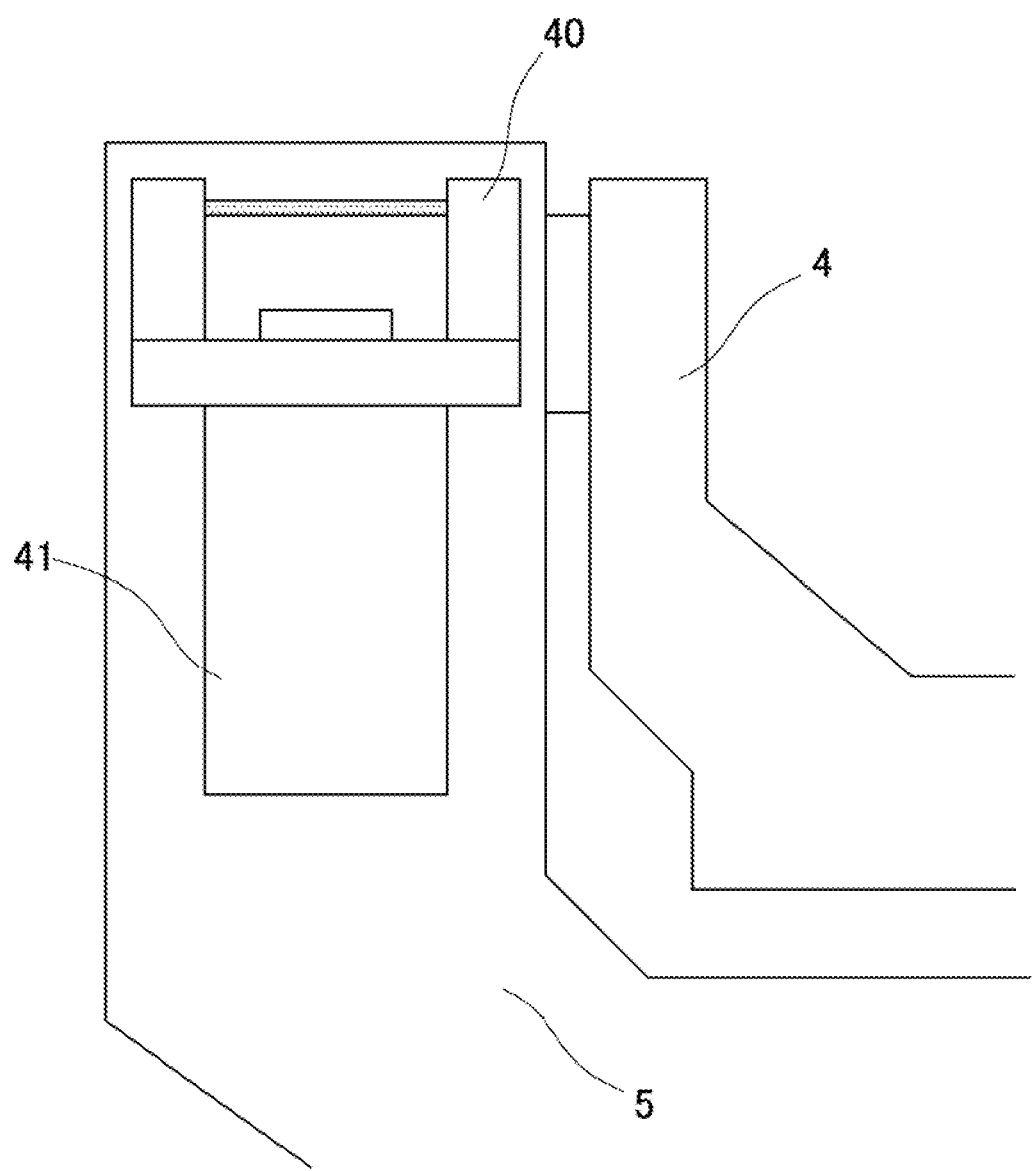
FIG. 6 is a schematic view of the laser sensor of the disclosure mounted to the machining center.
Figure 7:
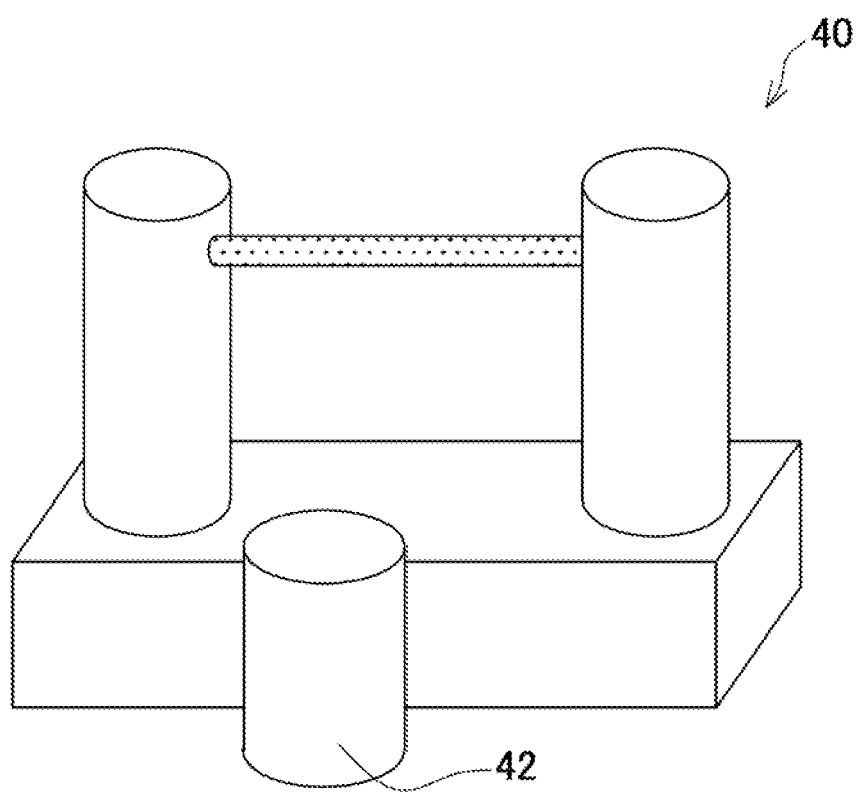
FIG. 7 is a schematic diagram of the laser sensor as one example of the tool sensor of the disclosure.

As illustrated in FIG. 6, the laser sensor 40 is mounted to the trunnion 5 of the machining center in FIG. 1 via a sensor mounting block 41. It should be noted that, as illustrated in FIG. 7, the reference block 42 may be separately disposed near the laser sensor 40.

Figure 8:
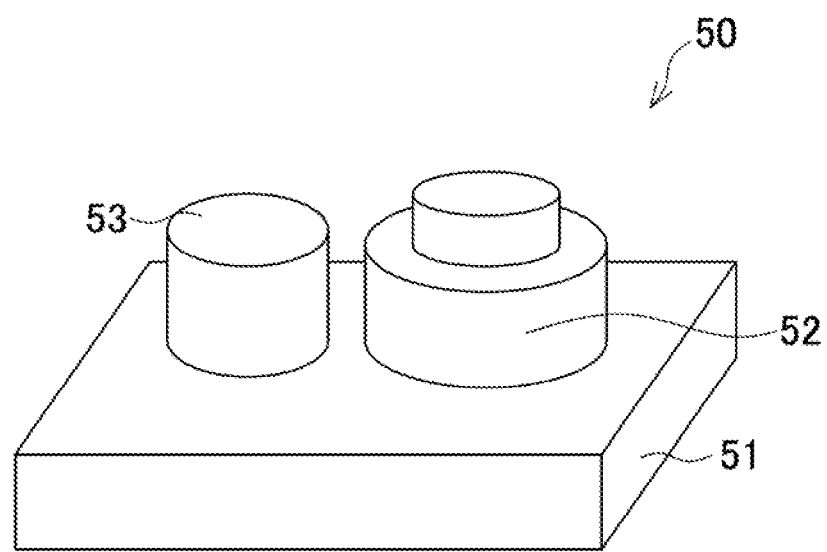
FIG. 8 is a schematic diagram of a touch sensor as one example of the tool sensor of the disclosure.
Figure 9:
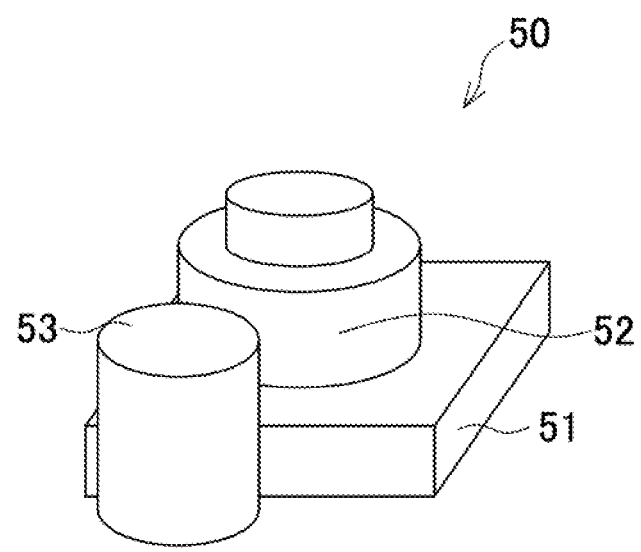
FIG. 9 is a schematic diagram of the touch sensor as one example of the tool sensor of the disclosure.

FIG. 8 is a schematic diagram of a touch sensor 50 as one example of the tool sensor of the disclosure. The touch sensor 50 is constituted of a base portion 51, a touch sensor portion 52, and a reference block 53. The touch sensor portion 52 and the reference block 53 are secured on the base portion 51. The touch sensor 50 is mounted to the trunnion 5 of the machining center in FIG. 1 similar to the laser sensor 40. As illustrated in FIG. 9, the reference block 53 may be separately disposed near the touch sensor 50.

The following describes a position measurement method and a position measurement system using the laser sensor 40 as the tool sensor (corresponding to the first and fifth aspects of the disclosure). It should be noted that, the case of the use of the touch sensor 50 differs only in a sensing method and is substantially identical.

Figure 10:
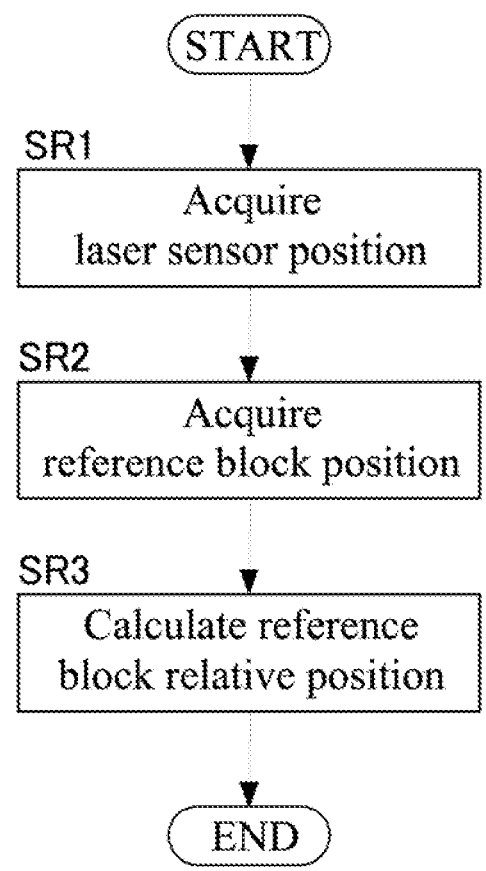
FIG. 10 is a flowchart for measurement preparation work of the disclosure.

First, the following describes a procedure for measurement preparation work based on a flowchart in FIG. 10. The measurement preparation work is work performed in advance before a measurement by a touch trigger probe as a position measurement sensor, which will be described later. It is only necessary to perform the measurement preparation work in the case of, for example, deterioration and exchange of a reference tool and laser sensor.

Figure 12:
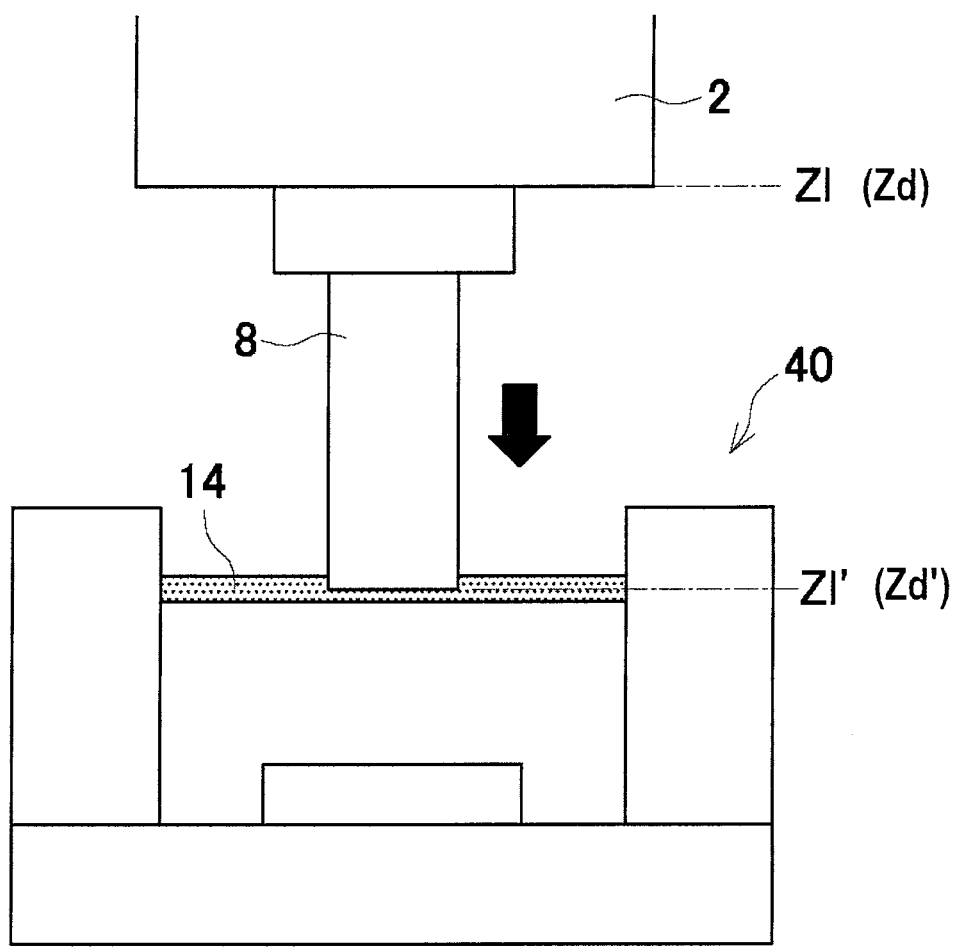
FIG. 12 is an explanatory view for Step SR1 in the measurement preparation work of the disclosure.

At Step SR1 in FIG. 10, as illustrated in FIG. 12, a reference tool 8 is installed to the main spindle 2 and is measured by the laser sensor 40. Here, the Z-axis is moved such that the reference tool 8 approaches the laser light 14 and the Z-axis position at a time point of a distal end of the reference tool 8 cutting off the laser light 14 and a light-receiving rate being a threshold or less or a time point considering a signal delay is acquired. A storage unit (not illustrated) in the control device is caused to store the acquired Z-axis position Z1 (a tool sensor position acquisition stage and tool sensor position acquisition means. Here, the control device functions as means that performs respective stages of the disclosure). The storage unit is also caused to preliminarily store a length Td of the reference tool 8. Here, a reference tool distal end position Z1' may be calculated from Z1 and Td (=Z1−Td) and stored.

Figure 13:
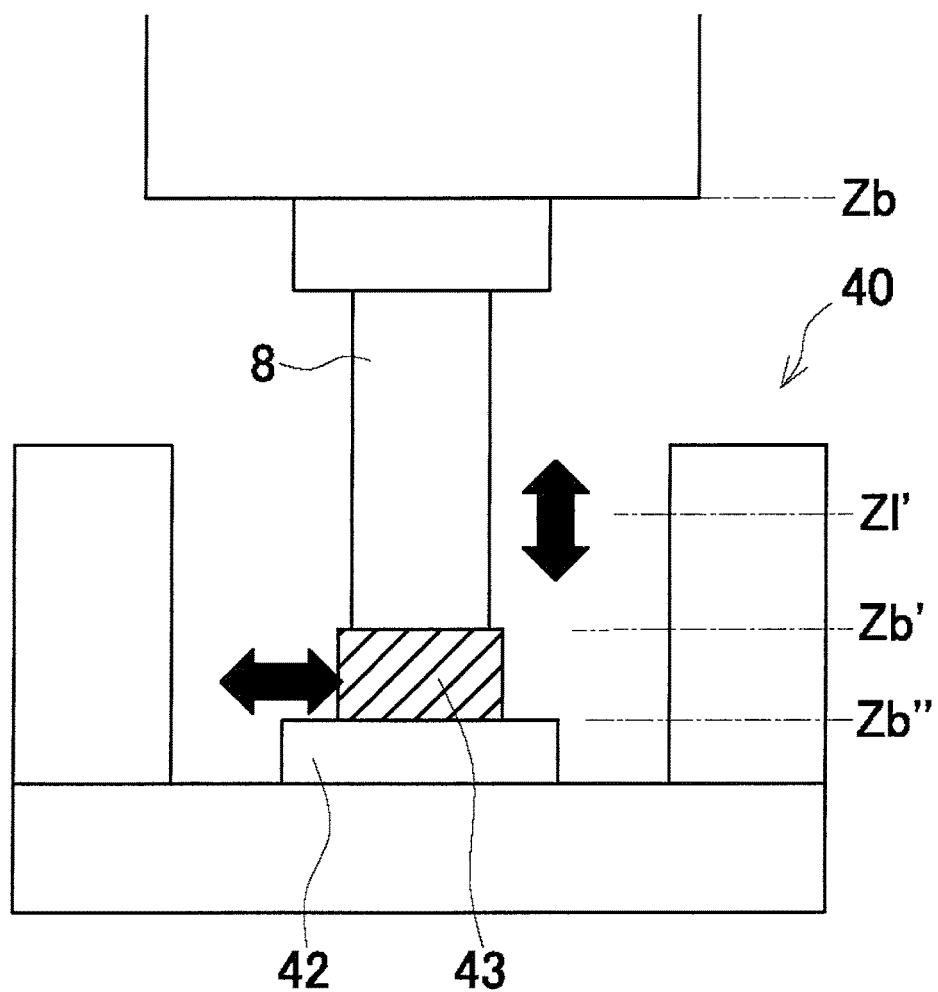
FIG. 13 is an explanatory view for Step SR2 in the measurement preparation work of the disclosure.

Next, at Step SR2 in FIG. 10, the position of the reference block 42 with the reference tool 8 is acquired. Here, as illustrated in FIG. 13, with the reference tool 8 installed to the main spindle 2, the reference tool 8 is brought into contact with the reference block 42 via a block gauge 43 to acquire a Z-axis position Zb at this time. The storage unit (not illustrated) in the control device is caused to store a value Zb' found by subtracting a thickness Hb of the block gauge 43 (=Zb−Hb) (a reference block position acquisition stage and reference block position acquisition means). A reference block top surface position Zb" may be calculated and stored also using Td (=Zb−Hb−Td). The block gauge 43 may be a block with already-known thickness dimension or a similar block.

Next, at Step SR3 in FIG. 10, a relative position dZb (=Z1−Zb') of the reference block 42 with respect to a sensing position of the laser sensor 40 is calculated from the Z-axis position Z1, which is stored at Step SR1, and the Z-axis position Zb', which is stored at Step SR2, and is stored in the storage unit in the control device (a relative position calculation stage and relative position calculation means). Here, the storage unit is also caused to store the block gauge thickness Hb, and dZb may be calculated from Z1, Zb, and Hb (dZb=Z1−Zb−Hb). It should be noted that, when Z1' and Zb" are stored, the calculation is made by dZb=Z1'−Zb".

Figure 11:
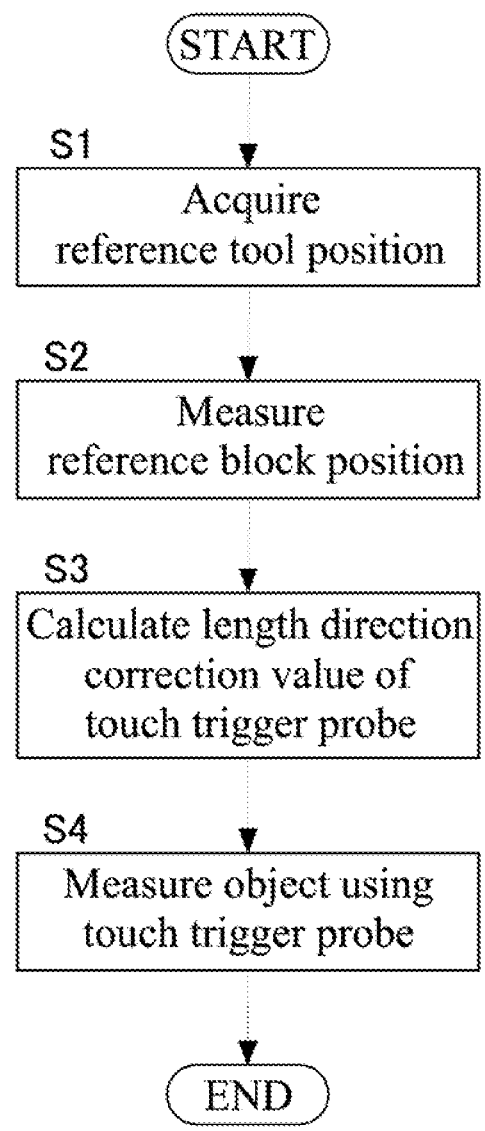
FIG. 11 is a flowchart for a position measurement method by a touch trigger probe of the disclosure.

The following describes the position measurement method by the touch trigger probe of the disclosure based on a flowchart in FIG. 11.

First, at Step S1 in FIG. 11, similar to Step SR1 in FIG. 10, the reference tool 8 is installed to the main spindle 2, and the laser sensor 40 performs the measurement. That is, as illustrated in FIG. 12 the storage unit in the control device (not illustrated) is caused to store a Z-axis position Zd (a reference tool position acquisition stage and reference tool position acquisition means). Here, a reference tool distal end position Zd' may be calculated using Td, Zd'=Zd−Td may be stored.

Figure 14:
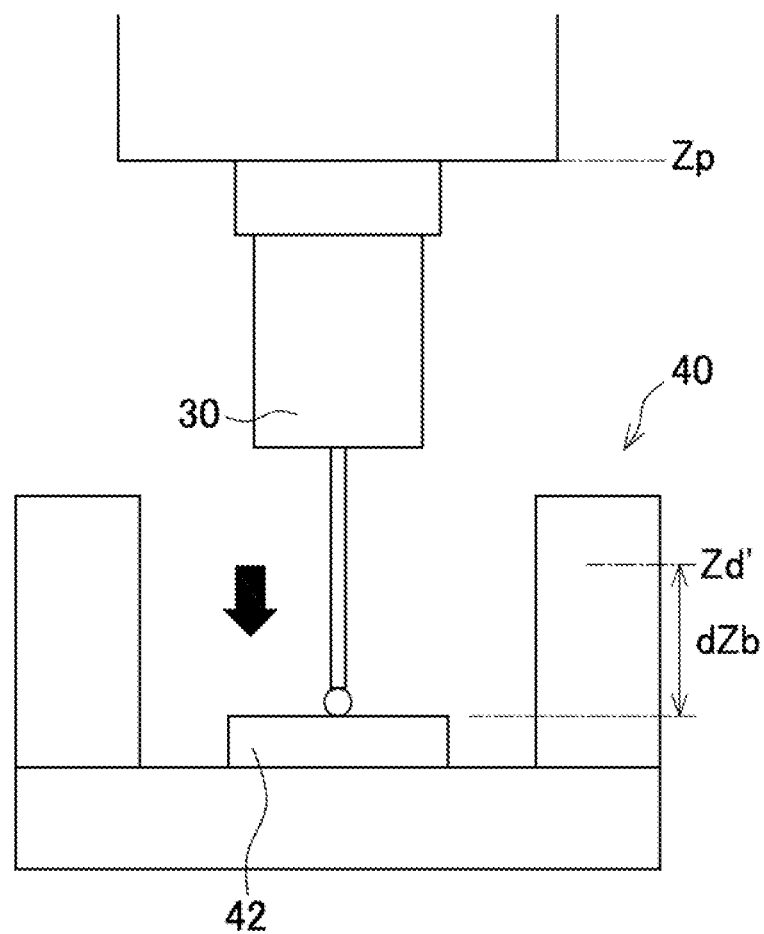
FIG. 14 is an explanatory view for Step S2 in the position measurement method of the disclosure.

Next, at Step S2 in FIG. 11, as illustrated in FIG. 14, a touch trigger probe 30 is installed to the main spindle 2 to measure the reference block 42 by the touch trigger probe 30. Here, the Z-axis is moved such that the touch trigger probe 30 approaches the reference block 42, and a Z-axis position Zp at a time point of a stylus at a distal end of the touch trigger probe 30 contacting the reference block 42 and the touch trigger probe 30 transmitting the trigger signal or a time point considering the signal delay is acquired. The storage unit in the control device (not illustrated) is caused to store the acquired Z-axis position Zp (a position measurement sensor measurement stage and measurement position acquisition means).

Next, at Step S3 in FIG. 11, the length of the touch trigger probe 30 in contact, which is the length direction compensation value of the touch trigger probe 30, is calculated. That is, the length direction compensation value (length in contact) Tp (=Zp−Zd+dZb+Td) is acquired from Zd stored at Step S1, Zp stored at Step S2, and the relative position dZb of the reference block 42 and the reference tool length Td, which are stored in the storage unit in the control device. The storage unit is caused to store the length direction compensation value Tp (a length compensation value calculation stage and length compensation value calculation means). Here, Tp (=Zp−Zd'−dZb) may be acquired from Zd', Zp, and dZb.

Figure 4:
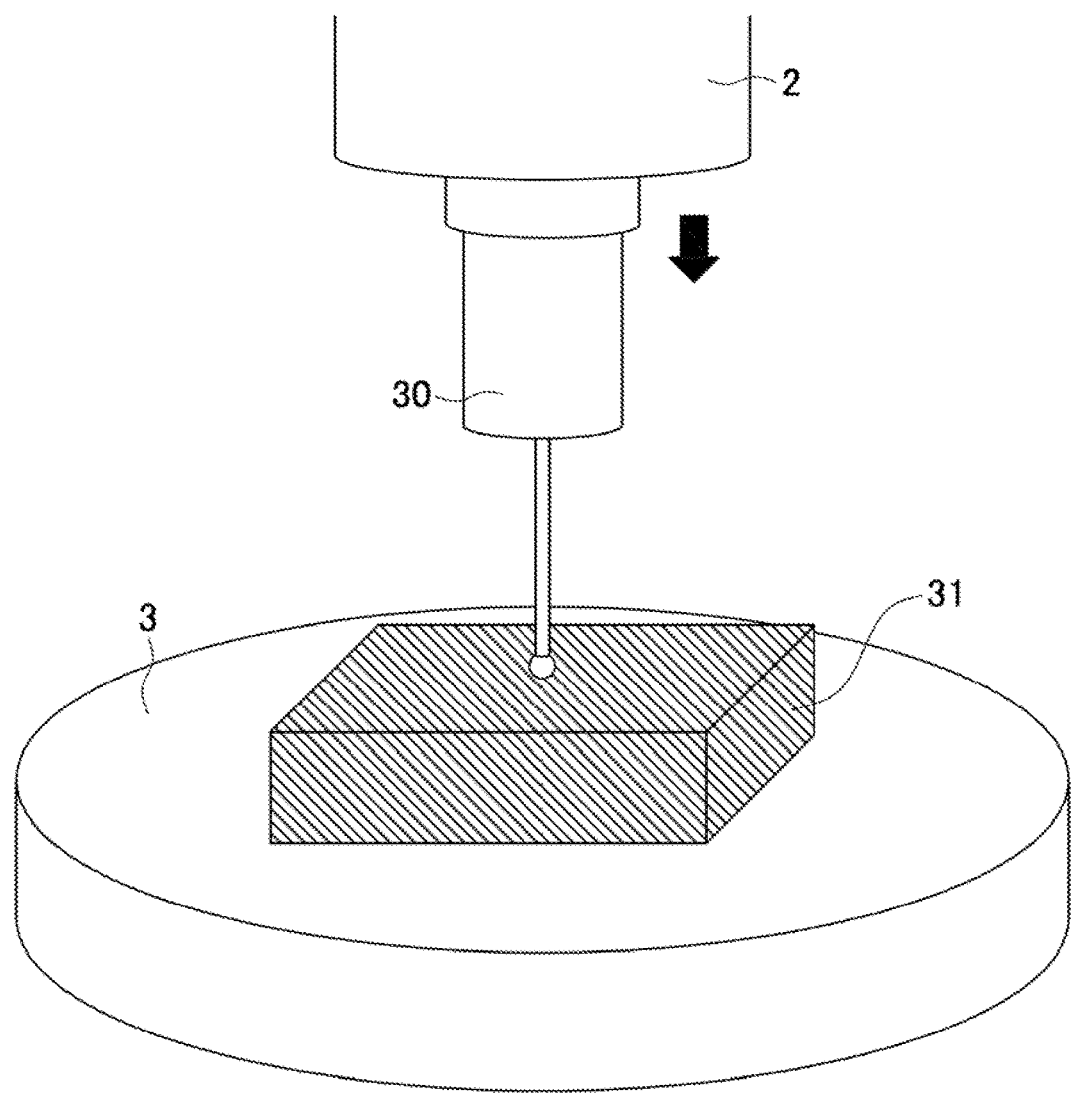
FIG. 4 is a schematic diagram of a touch trigger probe.

Next, at Step S4 in FIG. 11, an object (here, for example, as shown in FIG. 4, the workpiece on the table 3) is measured using the touch trigger probe 30. In this respect, the measurement position is compensated using the length direction compensation value Tp of the touch trigger probe 30 calculated at Step S3 (a position measurement stage and position calculation means).

Thus, with the position measurement method and the position measurement system with the above-described configuration, the relative position between the sensing position of the tool sensor and the reference block 42 is known in advance from the relationship between the sensing position of the tool sensor (the laser sensor 40 or the touch sensor 50) and the reference tool position brought into contact with the reference block 42. Thereafter, the tool sensor measures the position of the reference tool 8 and the position measurement sensor (the touch trigger probe 30) measures the position of the reference block 42 to allow the acquisition of the length direction compensation value (length in contact) of the touch trigger probe 30. In the above manner, the touch trigger probe 30 highly accurately measures the workpiece through the compensation using the length direction compensation value even if the length of the touch trigger probe 30 changes due to the thermal displacement or a similar cause. This method eliminates the need for the measurement system with the CCD camera or a similar system, thus ensuring and achieving a comparatively low price.

The following describes the position measurement method and the position measurement system using the touch sensor 50 illustrated in FIG. 8 (corresponding to the eighth and twelfth aspects of the disclosure).

Figure 15:
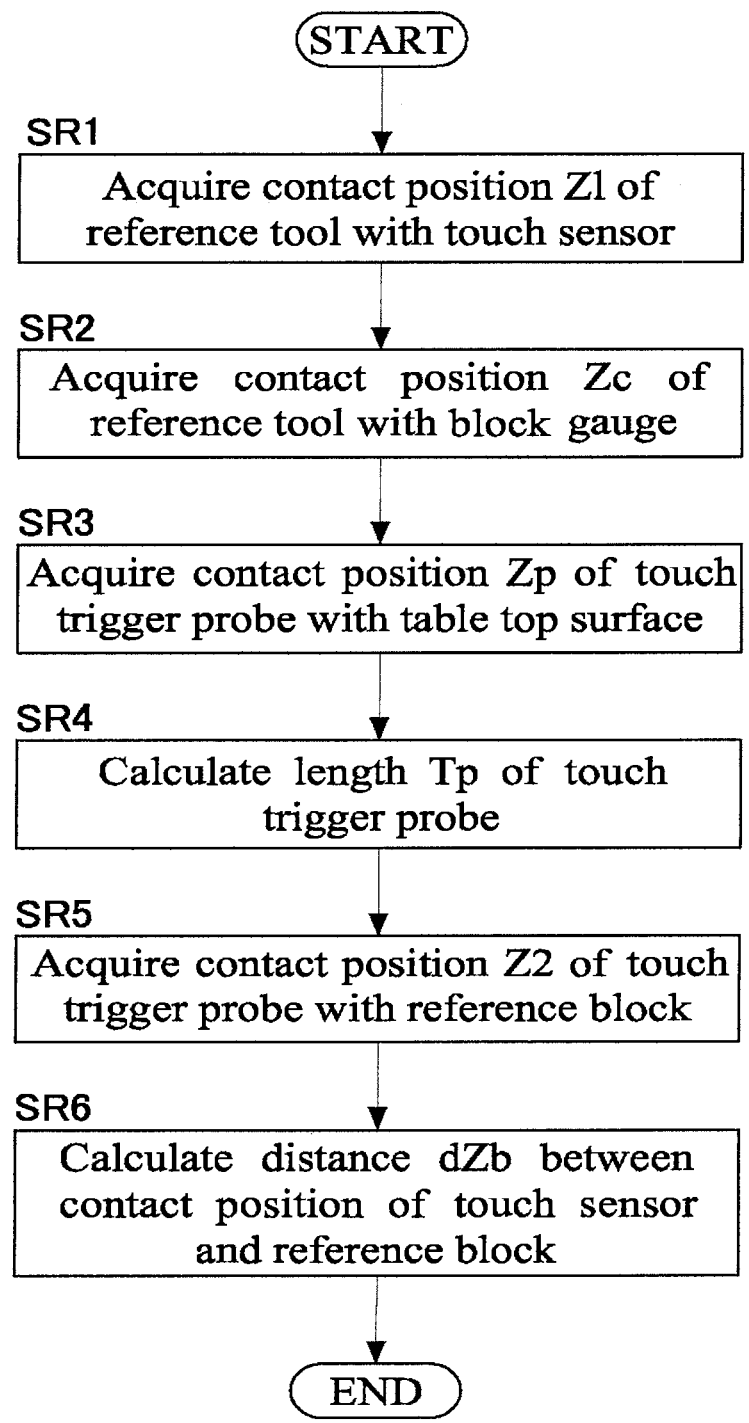
FIG. 15 is a flowchart for a modification example of the measurement preparation work of the disclosure.

First, the following describes the procedure for the measurement preparation work based on a flowchart in FIG. 15.

Figure 16:
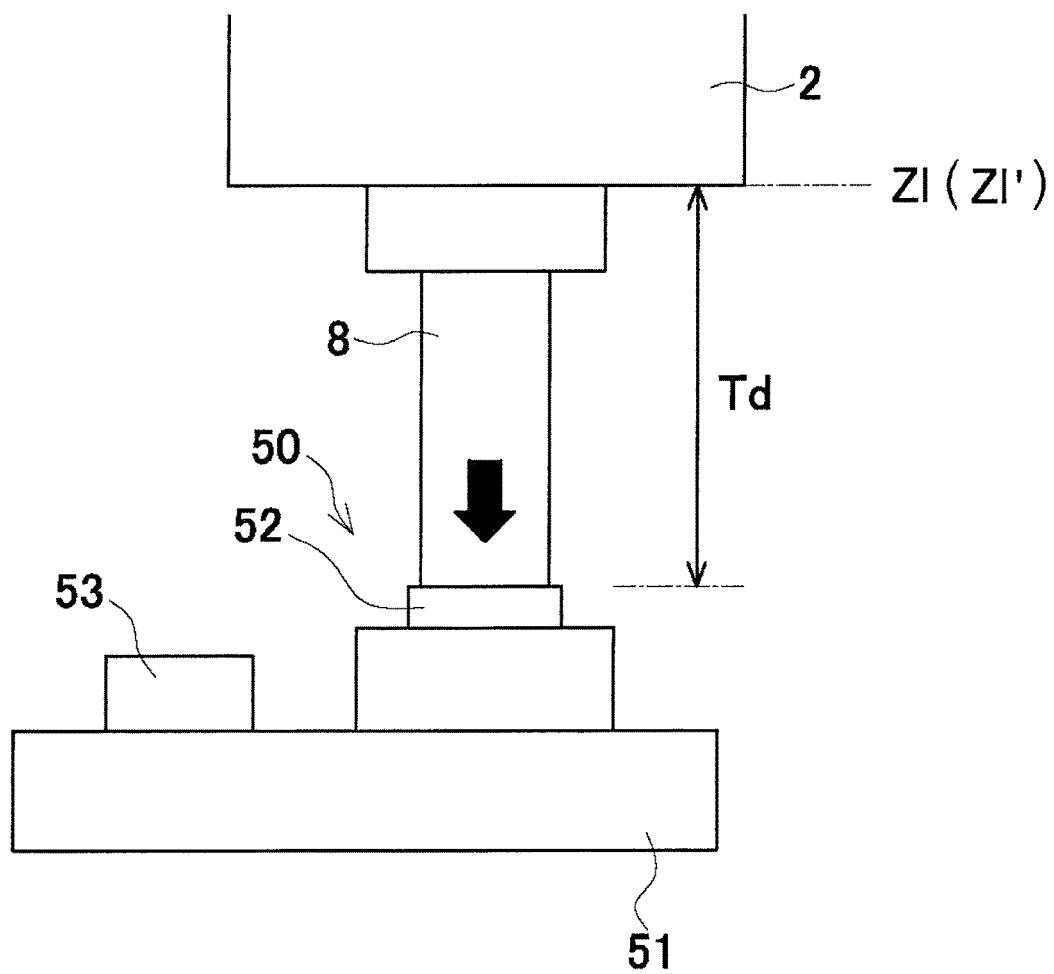
FIG. 16 is an explanatory view for Step SR1 of the modification example of the measurement preparation work of the disclosure.

At Step SR1 in FIG. 15, the reference tool 8 is installed to the main spindle 2 and is measured by the touch sensor 50. That is, as illustrated in FIG. 16, the Z-axis is moved such that the reference tool 8 contacts the touch sensor portion 52 and the Z-axis position at a time point of the distal end of the reference tool 8 pressing the touch sensor portion 52 or at a time point of considering the signal delay is acquired. The storage unit in the control device (not illustrated) is caused to store the acquired Z-axis position Z1 (the tool sensor position acquisition stage and the tool sensor position acquisition means). The storage unit is also caused to preliminarily store the length Td of the reference tool 8.

Figure 17:
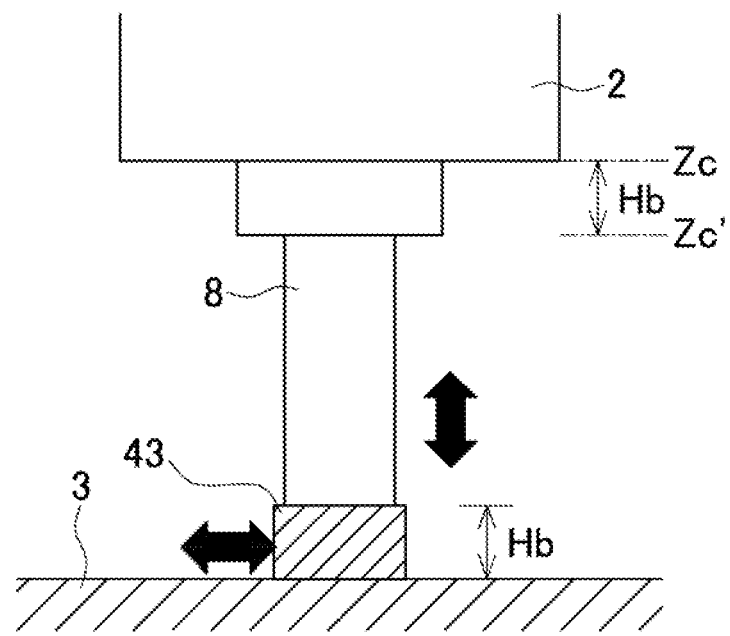
FIG. 17 is an explanatory view for Step SR2 of the modification example of the measurement preparation work of the disclosure.

Next, at Step SR2 in FIG. 15, any given measurement position such as the top surface of the table 3 is acquired with the reference tool 8 as a preliminary preparation to measure the length of the touch trigger probe. That is, as illustrated in FIG. 17, with the reference tool 8 installed to the main spindle 2, the reference tool 8 is brought into contact with the any given position such as the top surface of the table 3 via the block gauge 43 to acquire a Z-axis position Zc at this time. The storage unit in the control device (not illustrated) is caused to store a value Zc' found by subtracting the thickness Hb of the block gauge 43 (=Zc−Hb) (a reference tool measurement position acquisition stage and reference tool measurement position acquisition means). The block gauge 43 may be a block with already-known thickness dimension or a similar block.

Figure 18:
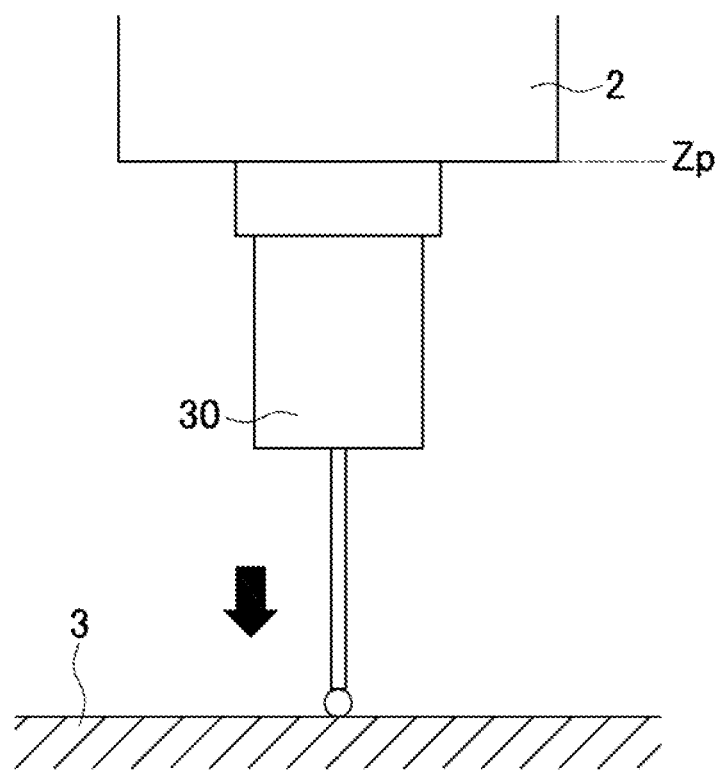
FIG. 18 is an explanatory view for Step SR3 of the modification example of the measurement preparation work of the disclosure.

Next, at Step SR3 in FIG. 15, the touch trigger probe 30 is installed to the main spindle 2 to measure the any given measurement position such as the top surface of the table 3. That is, as illustrated in FIG. 18, the Z-axis is moved such that the touch trigger probe 30 approaches the any given measurement position such as the top surface of the table 3, and the Z-axis position Zp at a time point of the stylus of the touch trigger probe 30 contacting the any given measurement position and the touch trigger probe 30 transmitting the trigger signal or at a time point considering the signal delay is acquired. The storage unit in the control device (not illustrated) is caused to store the acquired Z-axis position Zp (a position measurement sensor measurement position acquisition stage and position measurement sensor measurement position acquisition means).

Next, at Step SR4 in FIG. 15, the length of the touch trigger probe in contact, which is the length direction compensation value of the touch trigger probe, is calculated. That is, the length direction compensation value Tp is acquired from Zc' stored at Step SR2, Zp stored at Step SR3, and the reference tool length Tp (=Zp−Zc'+Td) and the storage unit is caused to store the length direction compensation value Tp (a position measurement sensor length calculation stage and position measurement sensor length calculation means).

Figure 19:
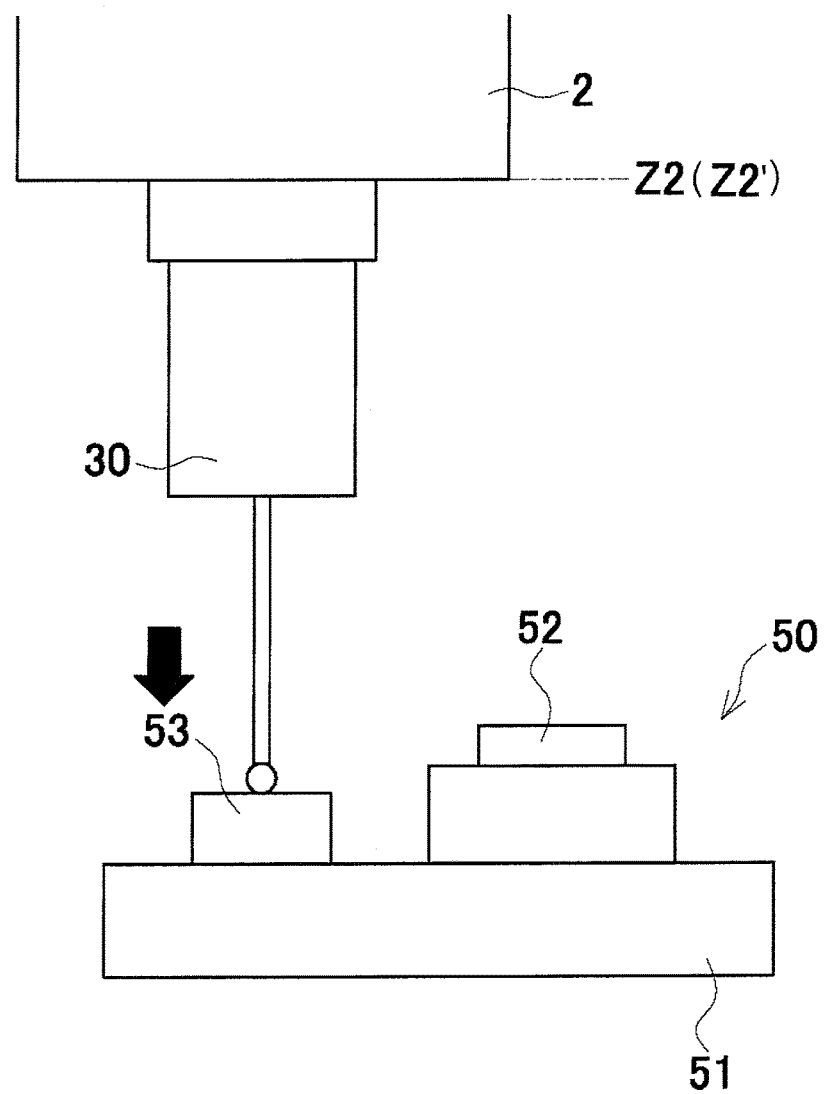
FIG. 19 is an explanatory view for Step SR5 of the modification example of the measurement preparation work of the disclosure.

Next, at Step SR5 in FIG. 15, the touch trigger probe 30 is installed to the main spindle 2 to measure a position Z2 of the reference block 53. That is, as illustrated in FIG. 19, the Z-axis is moved such that the touch trigger probe 30 approaches the reference block 53, and a Z-axis position Z2 at a time point of the stylus of the touch trigger probe 30 contacting the reference block 53 and the touch trigger probe 30 transmitting the trigger signal or at a time point considering the signal delay is acquired (a first reference block position acquisition stage and first reference block position acquisition means).

Next, at Step SR6 in FIG. 15, a distance dZb between the contact position of the touch sensor 50 and the reference block 53 is calculated. Here, the distance dZb between the contact position of the touch sensor 50 and the reference block 53 (=Z2+Tp−(Z1+Td)) is acquired from the contact position Z1 of the reference tool 8 with the touch sensor 50 acquired at Step SR1, the contact position Z2 of the touch trigger probe 30 with the reference block 53 acquired at Step SR5, the length direction compensation value Tp of the touch trigger probe 30, and the reference tool length Td. The storage unit is caused to store the distance dZb (the relative position calculation stage and the relative position calculation means).

The procedure of the measurement by the touch trigger probe in this case is identical to the flowchart in FIG. 11.

First, at Step S1 in FIG. 11, similar to Step SR1 in FIG. 15, the reference tool 8 is installed to the main spindle 2 and is measured by the touch sensor 50. The storage unit in the control device (not illustrated) is caused to store the Z-axis position Z1' as illustrated in FIG. 16 (the reference tool position acquisition stage and the reference tool position acquisition means).

Next, at Step S2 in FIG. 11, similar to Step SR5 in FIG. 15, the touch trigger probe 30 is installed to the main spindle 2 to measure the reference block 53 by the touch trigger probe 30. The storage unit in the control device (not illustrated) is caused to store a Z-axis position Z2' as illustrated in FIG. 19 (a second reference block position acquisition stage and second reference block position acquisition means).

Next, at Step S3 in FIG. 11, the length of the touch trigger probe 30 in contact, which is the length direction compensation value of the touch trigger probe 30, is calculated. That is, a length direction compensation value Tp' (=Z1'−Z2'+dZb+Td) is acquired from Z1' stored at Step S1, Z2' stored at Step S2, and the distance dZb between the contact position of the touch sensor 50 and the reference block 53 and the reference tool length Td, which are stored in the storage unit in the control device. The storage unit is caused to store the length direction compensation value Tp' (the length compensation value calculation stage and the length compensation value calculation means).

Next, at Step S4 in FIG. 11, the object is measured using the touch trigger probe 30. In this respect, the acquired position is compensated using the length direction compensation value Tp' of the touch trigger probe 30 calculated at Step S3 (the position measurement stage and the position measurement means).

Thus, with the position measurement method and the position measurement system with the above-described configuration as well, the relative position between the sensing position of the tool sensor and the reference block 53 is known in advance from the relationship between the sensing position of the touch sensor 50, the reference tool position where the touch trigger probe 30 is brought into contact with the reference block 53, the length of the touch trigger probe 30, and the reference tool 8. Thereafter, the tool sensor measures the position of the reference tool 8 and the touch trigger probe 30 measures the position of the reference block 53 to allow the acquisition of the length direction compensation value (length in contact) of the touch trigger probe 30. In the above manner, the touch trigger probe 30 highly accurately measures the workpiece through the compensation using the length direction compensation value even if the length of the touch trigger probe 30 changes due to the thermal displacement or a similar cause.

Especially, since the reference block position disposed at the touch sensor 50 is measured by the touch trigger probe 30, it is only necessary to configure an area of the reference block 53 by the amount that the stylus of the touch trigger probe 30 can contact the reference block position. Therefore, the reference block 53 is made small, thereby ensuring and achieving the further compact position measurement system. The touch sensor 50 in FIG. 9 can similarly perform the method and system of this configuration.

Figure 20:
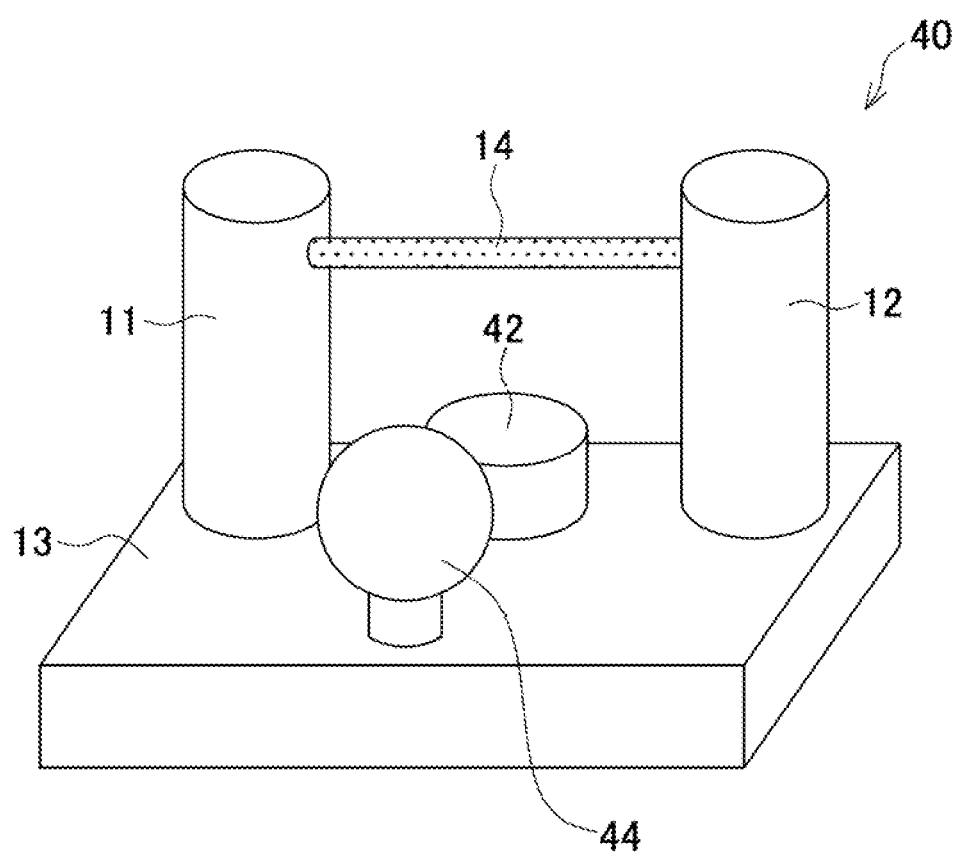
FIG. 20 is a schematic diagram of a laser sensor of a modification example of the tool sensor of the disclosure.
Figure 21:
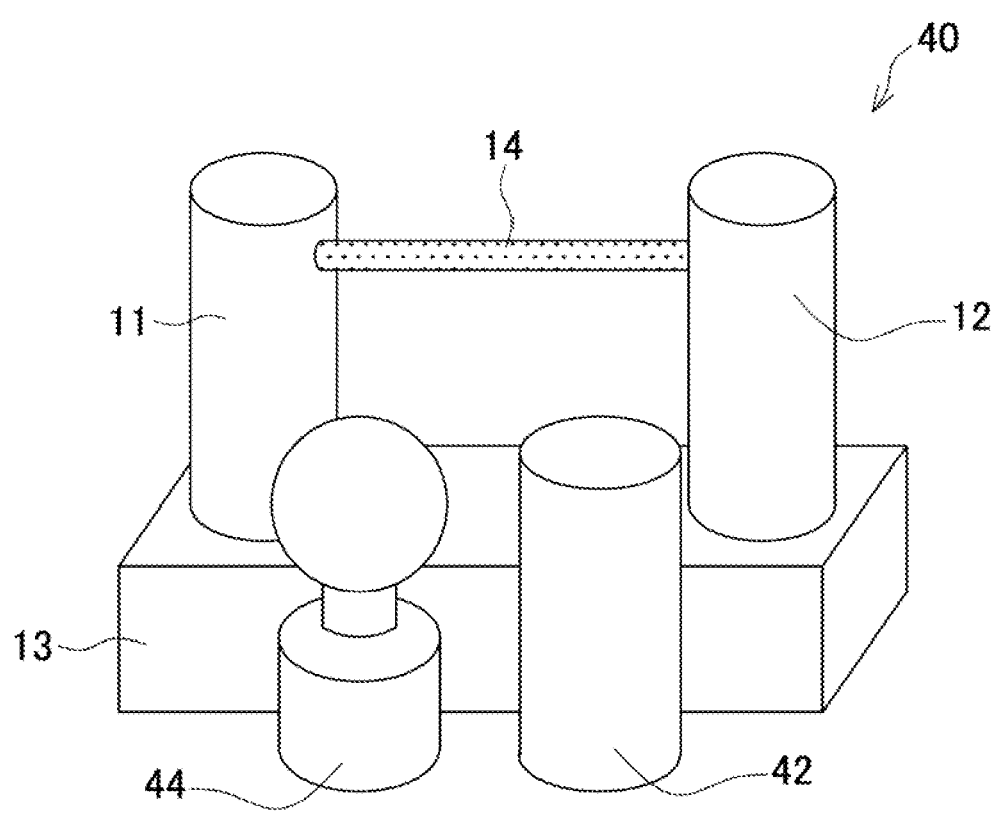
FIG. 21 is a schematic diagram of a laser sensor of a modification example of the tool sensor of the disclosure.

The following describes other embodiments of the disclosure using the drawings. FIG. 20 is a schematic diagram of the laser sensor 40 of another configuration of the disclosure. The laser sensor 40 includes a reference ball 44 in addition to the respective light emitting portion 11, light receiving portion 12, base portion 13, and reference block 42 similar to FIG. 5. The reference block 42 and the reference ball 44 are secured to the base portion 13. As illustrated in FIG. 21, the reference block 42 and/or the reference ball 44 may be separately disposed near the base portion 13.

Figure 22:
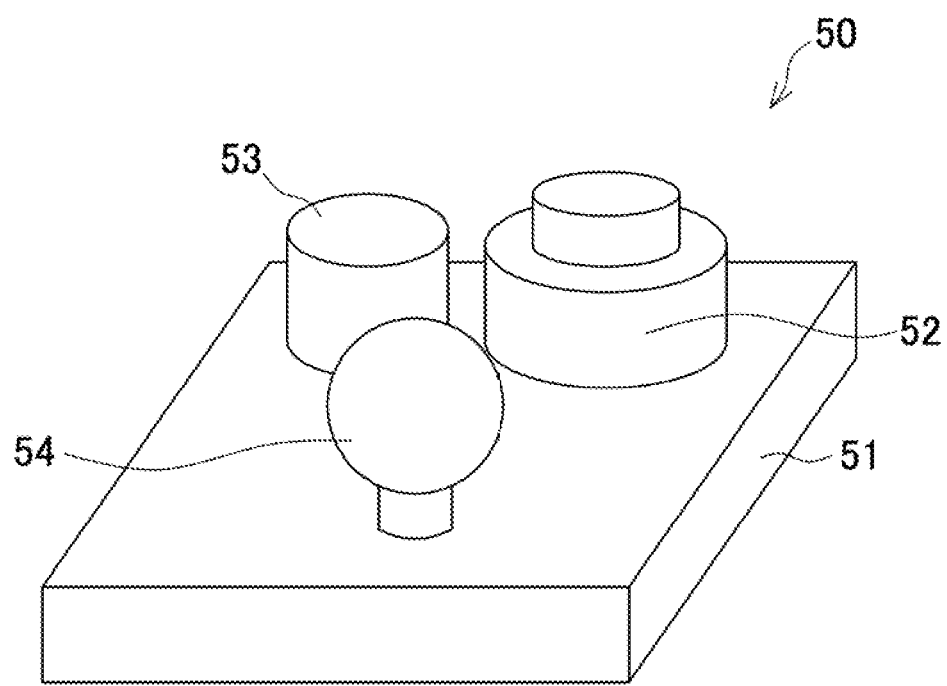
FIG. 22 is a schematic diagram of a touch sensor of a modification example of the tool sensor of the disclosure.
Figure 23:
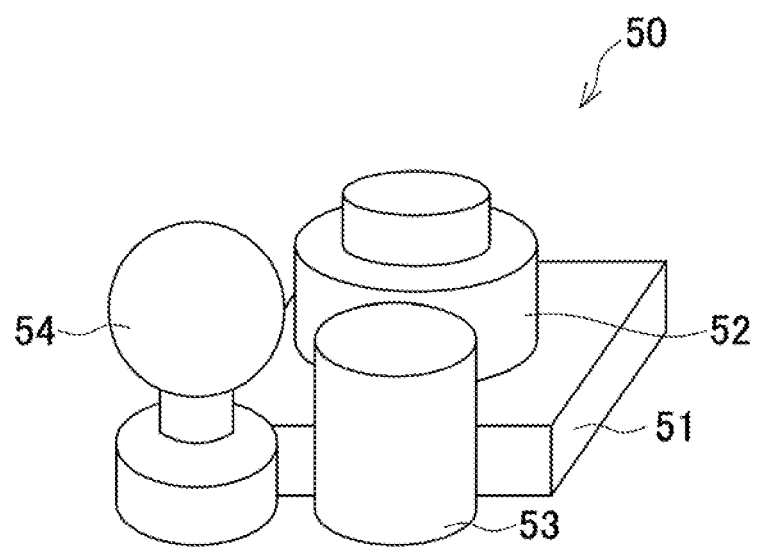
FIG. 23 is a schematic diagram of a touch sensor of a modification example of the tool sensor of the disclosure.

FIG. 22 is a schematic diagram of the touch sensor 50 of another configuration as one example of the tool sensor of the disclosure. The touch sensor 50 includes a reference ball 54 in addition to the respective base portion 51, touch sensor portion 52, and reference block 53 similar to FIG. 8. The touch sensor portion 52, the reference block 53, and the reference ball 54 are secured to the base portion 51. As illustrated in FIG. 23, the reference block 53 and/or the reference ball 54 may be separately disposed near the base portion 51.

The following describes the position measurement method using laser sensor 40 as the tool sensor. It should be note that the case of the use of the touch sensor 50 differs only in a sensing method and is substantially identical.

Figure 24:
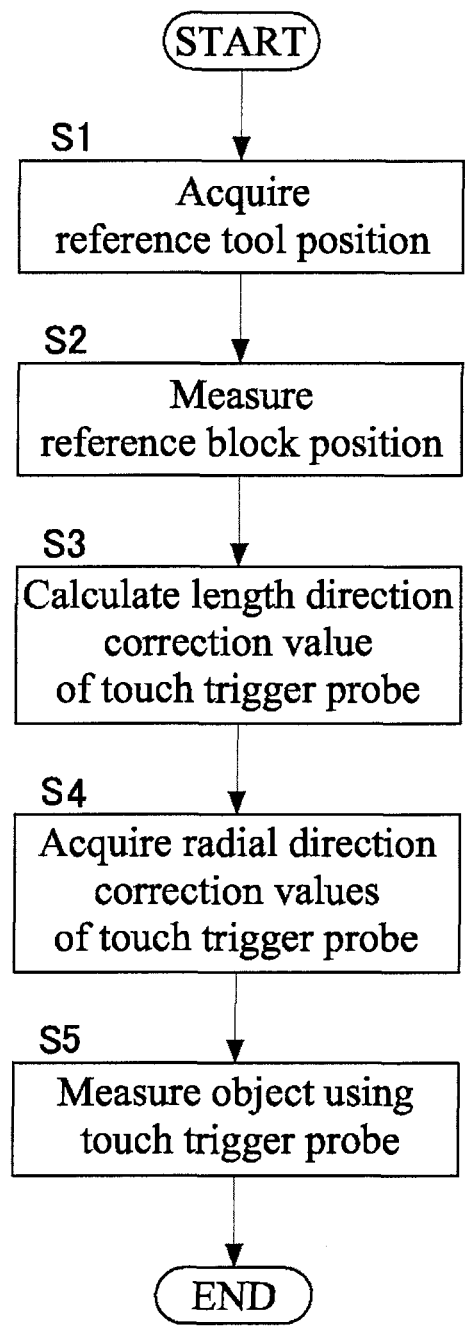
FIG. 24 is a flowchart for a position measurement method by the touch trigger probe of the disclosure.

The following describes the procedure of the measurement by the touch trigger probe based on a flowchart in FIG. 24. Regarding the measurement preparation work, the work identical to the flowchart in FIG. 10 is performed to acquire the relative position dZb in advance.

Since Steps S1 through S3 in FIG. 24 are identical to Steps S1 through S3 in FIG. 11, the explanation is omitted.

At Step S4 in FIG. 24, a diameter compensation value of the touch trigger probe 30 is acquired. Specifically, first, positive and negative directions of an X-axis and positive and negative directions of a Y-axis, four apexes in total, on an identical plane in a horizontal direction of the reference ball 44 (a radial direction of the touch trigger probe 30) are measured by the touch trigger probe 30. In this respect, the main spindle 2 is indexed such that a contact point of the touch trigger probe 30 becomes identical. An average value of the acquired X-axis positions and an average value of the acquired Y-axis positions each become X and Y-coordinate values of a sphere center. The four apexes are measured again with respect to X and Y of the center position. An X-axis positive direction compensation value Rxp, an X-axis negative direction compensation value Rxm, a Y-axis positive direction compensation value Ryp, and a Y-axis negative direction compensation value Rym of the touch trigger probe are calculated from a difference between the acquired four positions and the center position (a diameter compensation value acquisition stage and diameter compensation value acquisition means).

Next, at Step S5 in FIG. 24, the object is measured using the touch trigger probe 30. In this respect, the acquired position is compensated using the length direction compensation value Tp of the touch trigger probe 30 calculated at Step S3 and the radial direction compensation values Rxp, Rxm, Ryp, and Rym of the touch trigger probe 30 calculated at Step S4.

Thus, since the compensation values of the touch trigger probe 30 in the radial directions are acquired together, a further highly accurate measurement of the object is possible.

Although the configuration uses the touch trigger probe as the position measurement sensor, the disclosure is applicable to the case where a non-contact sensor such as a laser displacement sensor is used as the position measurement sensor for measurement of the position of the workpiece or a similar object. In this case, the length compensation value is not the length in contact but is an apparent distance between the object and the non-contact sensor at the measurement.

To acquire the reference block position, the configuration indirectly brings the reference tool into contact with the reference block using the block gauge. However, the reference tool may be directly brought into contact with the reference block without the block gauge.

Furthermore, the tool sensor position acquisition stage to the position measurement stage are executed once in the configuration. However, the tool sensor position acquisition stage to the relative position calculation stage may be executed once, and the reference tool position acquisition stage to the position measurement stage may be executed several times.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:
1. A position measurement method of object in machine tool for measuring a position of the object secured on a table by a position measurement sensor using the machine tool, the machine tool including three or more translational axes, a rotatable main spindle to which a tool is to be installed, and the table, the position measurement sensor being installable to the main spindle, the position measurement method comprising:
    a tool sensor position acquisition stage of installing a reference tool for a length reference of the tool to the main spindle and acquiring a sensing position of a distal end of the reference tool using a tool sensor;
    a reference block position acquisition stage of acquiring positions of the translational axes when the reference tool installed to the main spindle is directly or indi- rectly brought into contact with a reference block disposed at the tool sensor side;
a relative position calculation stage of calculating a relative position of the reference block with respect to the sensing position from the sensing position acquired in the tool sensor position acquisition stage and the positions of the translational axes acquired in the reference block position acquisition stage;
a reference tool position acquisition stage of installing the reference tool to the main spindle and acquiring a reference tool position using the tool sensor, the reference tool position being a distal end position of the reference tool;
a position measurement sensor measurement stage of installing the position measurement sensor to the main spindle and measuring a position of the reference block using the position measurement sensor;
a length compensation value calculation stage of calculating a length direction compensation value of the position measurement sensor from the reference tool position acquired in the reference tool position acquisition stage, the position of the reference block measured in the position measurement sensor measurement stage, the relative position calculated in the relative position calculation stage, and the length of the reference tool; and
a position measurement stage of compensating the measurement position of the object using the length direction compensation value of the position measurement sensor calculated in the length compensation value calculation stage, the object being measured by the position measurement sensor installed to the main spindle.

2. The position measurement method of object in machine tool according to claim 1, wherein
the tool sensor position acquisition stage to the relative position calculation stage are configured to be executed once, the reference tool position acquisition stage to the position measurement stage being configured to be executed several times.

3. The position measurement method of object in machine tool according to claim 1, wherein
in the position measurement sensor measurement stage and the position measurement stage, the positions measured by the position measurement sensor are positions of the translational axes when the position measurement sensor senses a contact with the object.

4. The position measurement method of object in machine tool according to claim 1, further comprising
a diameter compensation value acquisition stage of acquiring a radial direction compensation value of the position measurement sensor as a contact type sensor to the object, the diameter compensation value acquisition stage being performed before the execution of the position measurement stage, wherein
the position measurement stage includes compensating the measurement position of the object also using the diameter compensation value acquired in the diameter compensation value acquisition stage.

5. A position measurement system of object in machine tool for measuring a position of the object secured on a table by a position measurement sensor in the machine tool, the machine tool including three or more translational axes, a rotatable main spindle to which a tool is to be installed, the table, the position measurement sensor installable to the main spindle, and a control device configured to control the translational axes and the main spindle, the position measurement system comprising:
a reference tool for a length reference of the tool;
a tool sensor configured to detect a distal end position of the reference tool installed to the main spindle;
a reference block installed to the tool sensor side;
a tool sensor position acquisition unit configured to move the reference tool installed to the main spindle in the translational axes, the tool sensor position acquisition unit being configured to acquire and store a sensing position of the distal end of the reference tool using the tool sensor;
a reference block position acquisition unit configured to move the reference tool installed to the main spindle in the translational axes to directly or indirectly bring the reference tool into contact with the reference block, the reference block position acquisition unit being configured to acquire and store positions of the translational axes at the contact;
a relative position calculation unit configured to calculate and store a relative position of the reference block with respect to the sensing position from the sensing position acquired in the tool sensor position acquisition unit and the positions of the translational axes acquired in the reference block position acquisition unit;
a reference tool position acquisition unit configured to move the reference tool installed to the main spindle in the translational axes, the reference tool position acquisition unit being configured to acquire and store a reference tool position with the tool sensor, the reference tool position being the distal end position of the reference tool;
a measurement position acquisition unit configured to measure and store a position of the reference block with the position measurement sensor installed to the main spindle;
a length compensation value calculation unit configured to calculate and store a length direction compensation value of the position measurement sensor from the reference tool position acquired in the reference tool position acquisition unit, the position of the reference block acquired in the measurement position acquisition unit, the relative position acquired in the relative position calculation unit, and the length of the reference tool; and
a position calculation unit configured to compensate the measurement position of the position measurement sensor using the length compensation value stored in the length compensation value calculation unit and calculate the position of the object.

6. The position measurement system of object in machine tool according to claim 5, wherein
the position measurement sensor is configured to measure the positions of the translational axes when the position measurement sensor senses the object with or without considering a signal delay.

7. The position measurement system of object in machine tool according to claim 5, further comprising
a diameter compensation value acquisition unit configured to acquire and store a radial direction compensation value of the position measurement sensor as a contact type sensor to the object, wherein
the position calculation unit is configured to compensate the measurement position of the position measurement sensor using the length compensation value acquired in the length compensation value calculation unit and the diameter compensation value acquired in the diameter compensation value acquisition unit and calculate the position of the object.

8. A position measurement method of object in machine tool for measuring a position of the object secured on a table by a position measurement sensor using the machine tool, the machine tool including three or more translational axes, a rotatable main spindle to which a tool is to be installed, and the table, the position measurement sensor being installable to the main spindle, the position measurement method using a tool sensor and a reference block disposed at the tool sensor side, the position measurement method comprising:

a tool sensor position acquisition stage of installing a reference tool for a length reference of the tool to the main spindle and acquiring a sensing position of a distal end of the reference tool using the tool sensor;

a reference tool measurement position acquisition stage of acquiring any given tool measurement position using the reference tool installed to the main spindle;

a position measurement sensor measurement position acquisition stage of acquiring any given sensor measurement position using the position measurement sensor installed to the main spindle;

a position measurement sensor length calculation stage of acquiring a difference between the tool measurement position and the sensor measurement position and acquiring a length of the position measurement sensor based on the difference and the length of the reference tool;

a first reference block position acquisition stage of acquiring a position of the reference block using the position measurement sensor installed to the main spindle;

a relative position calculation stage of calculating a relative position of the reference block with respect to the sensing position from the sensing position acquired in the tool sensor position acquisition stage, the position of the reference block acquired in the first reference block position acquisition stage, the length of the position measurement sensor calculated in the position measurement sensor length calculation stage, and the length of the reference tool;

a reference tool position acquisition stage of installing the reference tool to the main spindle and acquiring a reference tool position using the tool sensor, the reference tool position being the distal end position of the reference tool;

a second reference block position acquisition stage of installing the position measurement sensor to the main spindle and measuring a position of the reference block using the position measurement sensor;

a length compensation value calculation stage of calculating a length direction compensation value of the position measurement sensor from the reference tool position acquired in the reference tool position acquisition stage, the position of the reference block measured in the second reference block position acquisition stage, the relative position calculated in the relative position calculation stage, and the length of the reference tool; and a position measurement stage of compensating the measurement position of the object using the length direction compensation value of the position measurement sensor calculated in the length compensation value calculation stage, the object being measured by the position measurement sensor installed to the main spindle.

9. The position measurement method of object in machine tool according to claim 8, wherein the tool sensor position acquisition stage to the relative position calculation stage are configured to be executed once, the reference tool position acquisition stage to the position measurement stage being configured to be executed several times.

10. The position measurement method of object in machine tool according to claim 8, wherein in the first reference block position acquisition stage, the second reference block position acquisition stage, and the position measurement stage, the positions measured by the position measurement sensor are positions of the translational axes when the position measurement sensor senses a contact with the object.

11. The position measurement method of object in machine tool according to claim 8, further comprising a diameter compensation value acquisition stage of acquiring a radial direction compensation value of the position measurement sensor as a contact type sensor to the object, the diameter compensation value acquisition stage being performed before the execution of the position measurement stage, wherein the position measurement stage includes compensating the measurement position of the object also using the diameter compensation value acquired in the diameter compensation value acquisition stage.

12. A position measurement system of object in machine tool for measuring a position of the object secured on a table by a position measurement sensor in the machine tool, the machine tool including three or more translational axes, a rotatable main spindle to which a tool is to be installed, the table, the position measurement sensor installable to the main spindle, and a control device configured to control the translational axes and the main spindle, the position measurement system comprising:

a reference tool for a length reference of the tool;

a tool sensor configured to detect a distal end position of the reference tool installed to the main spindle;

a reference block installed to the tool sensor side;

a tool sensor position acquisition unit configured to acquire and store a sensing position of the distal end of the reference tool using the reference tool installed to the main spindle and the tool sensor;

a reference tool measurement position acquisition unit configured to acquire and store any given tool measurement position using the reference tool installed to the main spindle;

a position measurement sensor measurement position acquisition unit configured to acquire and store any given sensor measurement position using the position measurement sensor installed to the main spindle;

a position measurement sensor length calculation unit configured to acquire a difference between the tool measurement position and the sensor measurement position, the position measurement sensor length calculation unit being configured to calculate and store a length of the position measurement sensor based on the difference and the length of the reference tool;

a first reference block position acquisition unit configured to measure and store a position of the reference block using the position measurement sensor installed to the main spindle;

a relative position calculation unit configured to calculate and store a relative position of the reference block with respect to the sensing position from the sensing position acquired in the tool sensor position acquisition unit, the position of the reference block acquired in the first reference block position acquisition unit, the length of the position measurement sensor calculated in the position measurement sensor length calculation unit, and the length of the reference tool;
a reference tool position acquisition unit configured to acquire and store a reference tool position using the reference tool installed to the main spindle and the tool sensor, the reference tool position being the distal end position of the reference tool;
a second reference block position acquisition unit configured to measure and store a position of the reference block using the position measurement sensor installed to the main spindle;
a length compensation value calculation unit configured to calculate and store a length direction compensation value of the position measurement sensor from the reference tool position acquired in the reference tool position acquisition unit, the position of the reference block measured in the second reference block position acquisition unit, the relative position calculated in the relative position calculation unit, and the length of the reference tool; and
a position calculation unit configured to compensate the measurement position of the object measured by the position measurement sensor installed to the main spindle using the length direction compensation value of the position measurement sensor calculated in the length compensation value calculation unit, the position calculation unit being configured to calculate a position of the object.

13. The position measurement system of object in machine tool according to claim 12, wherein
the position measurement sensor is configured to measure the positions of the translational axes when the position measurement sensor senses the object with or without considering a signal delay.

14. The position measurement system of object in machine tool according to claim 12, further comprising
a diameter compensation value acquisition unit configured to acquire and store a radial direction compensation value of the position measurement sensor as a contact type sensor to the object, wherein
the position calculation unit is configured to compensate the measurement position of the position measurement sensor using the length compensation value acquired in the length compensation value calculation unit and the diameter compensation value acquired in the diameter compensation value acquisition unit and calculate a position of the object.

* * * * *